United States Patent [19]
Iwaya

[11] Patent Number: 6,093,460
[45] Date of Patent: Jul. 25, 2000

[54] PAPER RECEPTACLE

[75] Inventor: Isao Iwaya, Osaka, Japan

[73] Assignee: Toyo Aluminum Foil Products Kabushiki Kaisha, Osaka-fu, Japan

[21] Appl. No.: 09/011,917

[22] PCT Filed: Feb. 5, 1997

[86] PCT No.: PCT/JP97/00333

§ 371 Date: Feb. 17, 1998

§ 102(e) Date: Feb. 17, 1998

[87] PCT Pub. No.: WO98/00341

PCT Pub. Date: Jan. 8, 1998

[30] Foreign Application Priority Data

Jul. 1, 1996 [JP] Japan .................................. 8-171287
Jul. 30, 1996 [JP] Japan .................................. 8-200542

[51] Int. Cl.⁷ .......................... B65D 1/34; B29C 53/00; B31B 1/25

[52] U.S. Cl. ..................... 428/34.2; 428/163; 428/192; 428/537.5; 220/608; 426/113; 426/127; 229/5.8; 229/5.81; 229/5.84; 229/406; 229/407; 229/902; 493/148; 493/158; 493/160; 156/224; 156/580; 156/581; 264/320

[58] Field of Search .................. 428/34.2, 537.5, 428/192, 163, 161; 426/113, 127, 129, 234; 229/5.81, 5.8, 5.84, 406, 407, 902, 903; 220/608; 156/224, 307.3, 580, 581; 264/320, 324; 493/148, 149, 158, 160

[56] References Cited

U.S. PATENT DOCUMENTS

| | | | |
|---|---|---|---|
| Re. 32,270 | 10/1986 | Murray, Jr. ........................ | 156/224 |
| 2,997,927 | 8/1961 | Carson ............................ | 229/406 |
| 3,752,387 | 8/1973 | Arfert ............................ | 229/5.81 |
| 4,026,458 | 5/1977 | Morris et al. ..................... | 229/5.84 |
| 4,183,435 | 1/1980 | Thompson et al. .................. | 229/406 |
| 4,442,969 | 4/1984 | Holden ........................... | 220/608 |
| 4,775,560 | 10/1988 | Katsura et al. .................. | 426/113 |
| 4,900,594 | 2/1990 | Quick et al. ..................... | 428/34.2 |
| 5,009,939 | 4/1991 | Goldberg ......................... | 428/34.2 |
| 5,585,027 | 12/1996 | Young ............................ | 426/234 |
| 5,593,610 | 1/1997 | Minerich et al. .................. | 426/234 |

FOREIGN PATENT DOCUMENTS

| | | |
|---|---|---|
| 48-30181 | 8/1946 | Japan . |
| 56-115313 | 2/1955 | Japan . |
| 50-161376 | 12/1975 | Japan . |
| 51-148583 | 12/1976 | Japan . |
| 02178031 | 7/1990 | Japan . |
| 05077344 | 3/1993 | Japan . |
| 6-6775 | 2/1994 | Japan . |
| 6-80615 | 11/1994 | Japan . |
| 7-40472 | 2/1995 | Japan . |
| 7-13715 | 3/1995 | Japan . |
| 8-85538 | 4/1996 | Japan . |

*Primary Examiner*—Rena L. Dye
*Attorney, Agent, or Firm*—Rabin & Champagne, PC

[57] ABSTRACT

A paperboard material 101 is mainly composed of a paperboard having a weight of 200 to 450 g/m², a density of 0.65 to 0.82 and a gas permeability of 50 to 200 sec. A first resin layer having liquid-impermeability and thermal resistance is formed entirely on the surface of the paperboard on the inner side of the receptacle, and a second resin layer having permeability to gas and liquid is formed entirely on the back surface of the paperboard. Radial score lines 117 are formed in the portion corresponding to the corners of the paperboard material 101 toward its outer periphery. The score lines 117 do not reach the outer periphery of the paperboard material 101 but terminate at the position at a distance "a" (1 to 3 mm). The score lines 117 are formed by pressing the paperboard with a pressing die from the side constituting the inner side of the receptacle toward the outer side.

16 Claims, 18 Drawing Sheets

INNER SIDE OF RECEPTACLE

OUTER SIDE OF RECEPTACLE

PAPER RECEPTACLE

TECHNICAL FIELD

The present invention relates to paper receptacles, and particularly to a paper receptacle with a curled periphery, paperboard (cardboard) used as the material for the paper receptacle, a method for forming the paper receptacle, and a machine for forming the paper receptacle.

BACKGROUND ART

Plastic receptacles made of synthetic resin such as polypropylene are conveniently used as lightweight and cost-effective receptacles for foods. However, the plastic receptacles, though very convenient, have a problem in destruction by fire. That is to say, the combustion calorie of synthetic resin is much larger than those of paper and the like and hence it generates a great amount of combustion heat for its bulk. Accordingly, temperature in the incinerator rises very high, which may damage the incinerator or reduce its life time.

For the reasons above, demands for paper receptacles with low combustion calorie are increasing these days, as substitutes for the plastic receptacles. The table below shows a comparison of combustion calories between a paper receptacle and a plastic receptacle with the same bulk.

TABLE 1

|  | Paper Receptacle | Plastic Receptacle |
| --- | --- | --- |
| Capacity | 150 ml | the same |
| Size | 110 mm square × 27 mm high | the same |
| Material Area | 220 cm² | the same |
| Material Composition | Three-layers structure of: polymethyl pentene (22 μm), paperboard (390 μm), vinyl resin coat (2 μm) | polypropylene sheet (500 μm) |
| Combustion Cal. | 33 Kcal/piece | 110 Kcal/piece |

Values of physical properties of materials;

|  | Specific gravity (g/cc) | Combustion heating value (KCal/Kg) |
| --- | --- | --- |
| Paperboard | 0.75 | 4,400 |
| polymethyl pentene | 0.83 | 11,000 |
| Vinyl resin | 1.40 | 4,500 |
| Polypropylene | 0.91 | 11,000 |

As can be clearly seen from the comparison above, the heating value of combustion of a paper receptacle is about one-third, or smaller, of that of a plastic one with the same bulk capacity.

FIG. 20 is a perspective view of a conventional rectangular paper receptacle with a curled periphery.

Referring to the figure, the rectangular receptacle has a bottom 123, peripheral walls 119 and 121 turned upwardly at a certain angle from the four sides of the bottom 123, peripheral corners 125 where the peripheral walls 119 and the peripheral walls 121 are connected, a flange 126 formed in the horizontal direction at the upper ends of the peripheral walls 119, 121 and the peripheral corners 125, and a curling 127 formed around the outer periphery of the flange 126.

FIG. 21 is a diagram showing the appearance of a blanked paperboard material for forming the receptacle shown in FIG. 20.

Referring to the figure, the paperboard material 101 is composed of a rectangular sheet material with four rounded corners. The dotted line shows the boundary corresponding to the bottom 123 of the formed receptacle. The parts located above and below it correspond to the peripheral walls 121, whose peripheries form peripheral straight portions 103. The parts located on the right and left sides of the bottom 123 correspond to the peripheral walls 119, whose peripheries form peripheral straight portions 105. As the parts corresponding to the peripheral corners 125, A score lines 117 are formed in the areas A to the outer periphery on radii extending from the central positions of the curved portions, 115a and 115b which are located in the bottom 123. The edges of the peripheral corners 125 form the curved portions 109 like circular arcs around the center positions 115a and 115b of the curved portions. In this diagram, the areas A are subjected to drawing in die forming or the like. The corners of the dotted line defining the bottom 123 are defined by the arcs of concentric circles with respect to the curved portions 109 around the centers 115a and 115b of the curved portions.

FIG. 22 is a process diagram schematically showing, in sections, the process of forming the paper receptacle of FIG. 20 with a forming machine using the paperboard material of FIG. 21.

The paperboard material 101 shown in (1) in the diagram is pressed between die members of the forming machine. Then the peripheral walls 119, 121 and 125 of the formed receptacle are formed as shown in (2), whose margins form the flat portion 129.

Next, as shown in (3), the flat portion 129 is formed into the horizontal flange portion 126 and an upstanding portion 133 for curling. Then as shown in (4), the upstanding portion 133 is curled and thus the curling 127 is formed around the entire periphery.

As stated above, the conventional rectangular paper receptacle with a curled periphery is formed from a sheet of paperboard material. Although a rectangular paper receptacle has been described as an example, circular receptacles are formed in the basically same way. In this case, the score lines are formed around the entire periphery of the paperboard material.

The conventional paper receptacle described above, having its entire periphery curled, is not sufficient as a receptacle when it is used as a receptacle with a cover or with protection film heat-sealed to protect its contents.

FIG. 23 is a cross-sectional view of the rectangular paper receptacle of FIG. 20 provided with a cover plate.

Referring to the diagram, the periphery 151 of the cover 150 is bent down to fit around the periphery of the curling 127 of the paper receptacle. Accordingly, increasing strength of the fit of the cover requires an increase of strength of the curling 127. As shown in FIG. 21, however, the score lines 117 are formed to the outer edge of the paperboard material 101, or to the part where the curling 127 is formed, and therefore the outer ends of the score lines 117 are intactly curled, resulting in reduction of the strength of the curling 127.

FIG. 24 is an end view of the main part of the rectangular paper receptacle of FIG. 20 with protection film sealed with heat.

Referring to the diagram, synthetic resin film 151, composed of a composite material of synthetic resin films of polypropylene, polyethylene, or the like, or of a composite material of paper or aluminum foil and a synthetic resin film or a heat-sealed material, is heat-sealed on the top surface of the flange 126 of the rectangular receptacle. To provide good heat sealing, it is preferable to form the top surface of the flange 126 smooth. However, particularly in the case of a rectangular receptacle, the corner portions are apt to be corrugated in forming. This degrades the smoothness of the flange 126, which may cause inferior heat sealing.

Furthermore, recently, paper receptacles are used as easy heat-resisting receptacles, heated in an oven or the like together with foods contained therein. In such a case, the paper receptacle is formed by using a paperboard provided with heat-resisting resin coating or heat-resisting resin film (density: 0.85–0.90, permeability (by the testing method based on the English version of JIS P8117): 250–600 sec) on its inner side.

This publication specifies the testing method for the air permeability of paper and paperboard that permits 100 ml air to pass through an area of 645 $mm^2$ in 2 to 1800 seconds. Such materials as crepe and corrugated papers of which clamping down cannot shut out its surface and edge leakage, are excluded from the application of this standard.

The testing device is divided into two types, Types A and B, consisting of an outer cylinder partly filled with oil and an inner cylinder which can freely slide in the outer cylinder and having an open or closed top. In Type B, the cylinder is of concentric double cylinder construction, having an open top, containing the oil in itself, and the inner cylinder forms an air passage reaching the lower clamping plate. Air pressure for the test is provided by the mass of the inner cylinder.

The testing device is of a construction capable of applying an air pressure onto the test piece held between the clamping plates having a circular orifice of 28.6±0.1 mm in diameter. The clamping plates may form the top of the inner cylinder (in Type A) or may be mounted in the base of the testing device (in Type B). (The latter construction is disclosed as being preferable.) An elastic gasket is attached to the clamping plate on the side exposed to air pressure, and the test piece is held in contact with the gasket when clamped for the test.

The gasket consists of a thin, elastic, oil-resistant, non-oxidizing material having a smooth surface and capable of preventing air from leaking through the test piece and the clamping plate. An oil-resistant rubber, such as grade S.T. Thiokol gasket of 0.77 mm in thickness, and of 50 to 60 in Durometer hardness, is disclosed as being a satisfactory gasket material. The inside diameter of the gasket is 28.6 mm and the outside diameter 34.9 mm. The bolt holes in the gasket are centered exactly to those in the clamping plate, and, in order to align and protect the gasket in use, it is cemented with shellac into a groove machined in the clamping plate. This groove is concentric with the aperture in the opposite orifice plate, and 28.4 mm in inside diameter, 35.2 mm in outside diameter and 0.5 mm in depth for convenience in inserting and attaching the gasket. The outer cylinder is 254 mm high and has an internal diameter of 82.5 mm, and marked with a level line at 127 mm from the inner bottom.

The outer cylinder is equipped with four bars, each 190 mm in length, 2.4 mm in width and 2.4 mm in thickness, on the inner surface to act as guide tracks for the inner cylinder. The inner cylinder is graduated in units of 50 ml, and has a total range of 350 ml. It is 254 mm high, and has an external diameter of 76.2 mm, an internal diameter of 74 mm and a mass of 567±1.0 g. Or, the inner cylinder may be graduated in units of 25 ml for the first 100 ml and have a range of 400 ml.

The oil used in the testing device is a lubricating oil having 60 to 70 seconds Saybolt Universal viscosity at 37.8° C. {10 to 13 $mm^2/s$} and a flash point of not less than 135° C.

The publication discloses that a light spindle oil is suitable for this purpose. Oil is used in preference to water, because it does not affect the moisture content of the sample nor does it affect the aluminum inner cylinder. The oil does not contain any essential oil or easily volatile oil.

The device is tested for air leakage by clamping a thin piece of smooth, hard-surface airtight material, such as metal foil or cellophane, clamped between the orifice plates. The leakage should not exceed 50 ml in 5 h.

The test piece is approximately 50×130 mm in size. Test pieces of not less than 50×50 mm may be used in the device having the clamp in the base.

Test pieces are conditioned prior to testing.

The testing device is placed on a level surface so that the inner cylinder becomes vertical. The outer cylinder is filled with oil to the level line of 127 mm depth marked on the inner surface of the cylinder.

If Type A device having the clamp in the top of the inner cylinder is used, the inner cylinder is raised, held in a raised position with one hand, the test piece is clamped between clamping plates, then the cylinder is lowered, and allowed to float on the oil.

If Type B device is used, the inner cylinder is taken out, the test piece is clamped, the inner cylinder is inserted into the outer cylinder, the inner cylinder is gradually lowered, and allowed to float on the oil.

When the device having the clamp in the base is used, first the inner cylinder is raised until its top rim is supported by the catch, the test piece is clamped between the clamping plates, then the inner cylinder is gently lowered until it floats. When the steady movement of the inner cylinder has been attained, using a stopwatch or other timing device, the number of seconds required for the graduations from 0 to 100 ml to pass the rim of the outer cylinder are measured. For very resistant papers, the reading may be taken at the end of first 50 ml graduation, and the results doubled. For porous papers, the number of seconds for 100 ml or over may be read, and converted to the 100 ml standard volume.

The test for at least five test pieces for each top side and back side is performed, and the average of the results is taken. However, for heterogeneous papers, the test is performed for not less than 10 test pieces, and the average is taken by discarding extraordinary values.

In clamping the test piece, the inner cylinder is suspended with one hand, and the nuts alternately fastened so that the pressures on both sides become equal to each other. Care should be taken not to excessively fasten the nut on either side alone, or it can cause air leakage through the clamping plate and the test piece.

The average number of seconds required for the displacement of 100 ml of air through the paper of an area of 645 $mm^2$ is taken as the air permeability, and the value which is rounded to two significant digits is reported.

In this case, when the bottom of the paper receptacle is heated (e.g., when cooked at atmospheric temperatures of 200–250° C. for 10–20 minutes), then the heat-resisting coating or the heat-resisting film may be lifted and peel off from the paperboard.

DISCLOSURE OF INVENTION

An object of the present invention is to provide a paper receptacle with curling with increased strength, with reduced inferior heat sealing and with increased heat resistance.

Another object of the present invention is to provide a paperboard material formed as the paper receptacle above, a method of forming the paper receptacle above, and a machine for forming the paper receptacle above.

To achieve the objects above, a first aspect of the present invention relates to a paperboard material for a paper receptacle at least having a peripheral wall and having its outer periphery curled, which has a plurality of score lines impressed from the surface to the back side to extend approximately radially from a portion corresponding to the peripheral wall toward the outer periphery and to terminate inside the outer periphery at a certain distance therefrom.

A second aspect of the present invention relates to a paper receptacle formed only by press-forming from a sheet of paperboard material, which includes a bottom portion, a side wall portion connecting with the bottom portion, a flange portion connecting with the side wall portion and extending in a horizontal direction, and a curled portion formed around the outer periphery of the flange portion, wherein the surface of the flange portion has smoothness which enables heat sealing.

According to a third aspect of the present invention, in the paper receptacle of the second aspect of the present invention, a plurality of score lines are impressed on the paperboard material from the surface to the back side to approximately radially extend toward the outer periphery.

A fourth aspect of the present invention relates to a paper receptacle formed only by press-forming a sheet of paperboard material, wherein the paperboard material has a multi-layered structure including a paperboard having a weight of 200 to 450 g/m$^2$, a density of 0.65 to 0.82, and a gas permeability of 50 to 200 sec, a first resin layer formed on the entire surface of the paperboard and having liquid-impermeability and thermal resistance, and a second resin layer formed on the entire back surface of the paperboard and having permeability to gas and liquid.

A fifth aspect of the present invention relates to a method for forming a paper receptacle in which a paperboard material composed of a sheet material having an outer periphery of polygonal shape with a straight portion and a curved portion with rounded corners and having a plurality of score lines impressed from the surface to the back side to approximately radially extend toward the outer periphery in a portion corresponding to the curved portion is formed into a paper receptacle, which includes the steps of: compacting a straight peripheral portion corresponding to the straight portion in the outer peripheral portion of the paperboard material and a curved peripheral portion corresponding to the curved portion in the outer peripheral portion of the paperboard material in such a way that the straight peripheral portion has a smaller thickness than the curved peripheral portion, forcing the compacted straight peripheral portion and curved peripheral portion into a clearance narrower than the respective compacted thicknesses to iron and compress the straight peripheral portion and curved peripheral portion, and curling the compressed outer peripheral portion of the paperboard material to form a curled portion.

A sixth aspect of the present invention relates to a machine for forming a paper receptacle having a bottom portion, a side wall portion connecting with the bottom portion, a flange portion connecting with the side wall portion and extending in a horizontal direction, and a curled portion formed around the outer periphery of the flange portion, which includes: a pair of first and second die members for pressing a paperboard material interposed therebetween to form the bottom portion, the side wall portion and the flange portion, the first and second die members being so formed that the bottom portion and the side wall portion form, when being pressed, an angle smaller than the corresponding angle of after being formed and the side wall portion and the flange portion form an angle smaller than the corresponding angle of after being formed; a pair of first and second outer frame members provided respectively around, and corresponding to, the pair of die members so as to abut on each other while pressing; and a curl ring member provided between the second die member and the second outer frame member so as to abut on the inner end of the abutting surface of the first outer frame member while pressing; wherein the inner end of the abutting surface of the first outer frame member and the abutting surface of the curl ring member have respective circular grooves facing each other, the grooves having inner wall surfaces curved in the curling direction, the respective grooves being formed to constitute a curling groove when abutting; the inner end of the groove of the first outer frame member is formed so as to be located outside the inner end of the groove of the curl ring member when abutting and to form such a clearance, with the inner wall surface of the groove of the curl ring member, as can pinch and compact the edge of the outer peripheral portion of the paperboard material; the first die member and the first outer frame member relatively move toward the second die member and the second outer frame member, whereby the paperboard material is held between the pair of die members and the outer peripheral portion of the paperboard is pressed and compacted between the pair of outer frame members; and with the pair of die members holding the paperboard material therebetween, the first outer frame member, the second outer frame member and the curl ring member, while abutting, relatively move to the side of the second outer frame member, whereby the outer peripheral portion of the paperboard material is forced into a clearance between an inner peripheral surface of the first outer frame member and an outer peripheral surface of the second die member and ironed and compressed; and when the edge of the outer peripheral portion of the paperboard material is located at the inner end of the curling groove, only the curl ring member is caused to stop moving, whereby the edge of the outer peripheral portion of the paperboard material is pinched and compacted between the inner end of the groove of the first outer frame member and the inner wall surface of the groove of the curl ring member and the edge of the outer peripheral portion of the paperboard material is set in the curling direction; and after setting the edge of the outer peripheral portion of the paperboard material in the curling direction, the first outer frame member, the second outer frame member and the curl ring member are moved, while abutting, in the opposite direction, to the side of the first outer frame member, whereby the outer peripheral portion of the paperboard material is inserted into the curling groove and curled along the inner wall surface of the curling groove, so as to form the curled portion.

According to a seventh aspect of the present invention, in the machine for forming a paper receptacle of the sixth aspect of the present invention, the paper receptacle is a polygonal paper receptacle having its outer periphery formed of a straight portion and a curved portion, and the first and second outer frame members are so formed that the press thickness of a flange straight portion corresponding to the straight portion in the portion forming the flange portion when pressing is smaller than the press thickness of a flange curved portion corresponding to the curved portion in the portion forming the flange portion.

As explained above, according to the paperboard material of the first aspect of the present invention, the plurality of score lines do not reach the outer periphery of the paperboard material but terminate on the inner side of the outer periphery at a certain distance away therefrom. Accordingly, when the outer peripheral portion of the paperboard material is curled, the absence of the score lines at least in part of the curled region increases the strength of the curl.

According to the paper receptacle of the second aspect of the present invention, the surface of the flange portion of the formed paper receptacle has smoothness enough to allow heat sealing. Therefore, when protection film is heat sealed to the paper receptacle, the defective rate of sealing can be reduced.

According to the paper receptacle of the third aspect of the present invention, in addition to the effect of the paper receptacle of the second aspect of the present invention, the plurality of score lines impressed from the surface to the back side absorb corrugations taking place on the inner side of the receptacle to give increased smoothness to the surface.

According to the paper receptacle of the fourth aspect of the present invention, the paperboard material is of multi-layered structure including a paperboard, a first resin layer and a second resin layer having certain values of physical properties and characteristics. This prevents peeling off of the first resin layer from the paperboard due to heating when this paper receptacle is used as a heat-resisting receptacle.

According to the method of forming a paper receptacle of the fifth aspect of the present invention, the outer peripheral portion of the paperboard is so compacted, ironed and compressed that the straight peripheral portion is thinner than the curved peripheral portion, which prevents buckling and breakage of the paperboard in forming.

According to the machine for forming a paper receptacle of the sixth aspect of the present invention, the first and second die members are so constructed that the angle between the bottom portion and the side wall portion in pressing and the angle between the side wall portion and the flange portion are smaller than the corresponding angles of after the forming. Accordingly, even when forming a porous paperboard material lacking firmness, high resistance is secured to deformation.

According to the machine for forming a paper receptacle of the seventh aspect of the present invention, in addition to the effect of the forming machine of the sixth aspect of the present invention, the first and second outer frame members are so formed that the press thickness of the flange straight portion is smaller than the press thickness of the flange curved portion when pressing. This prevents buckling and breakage of the paperboard material when the paperboard material is compressed.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
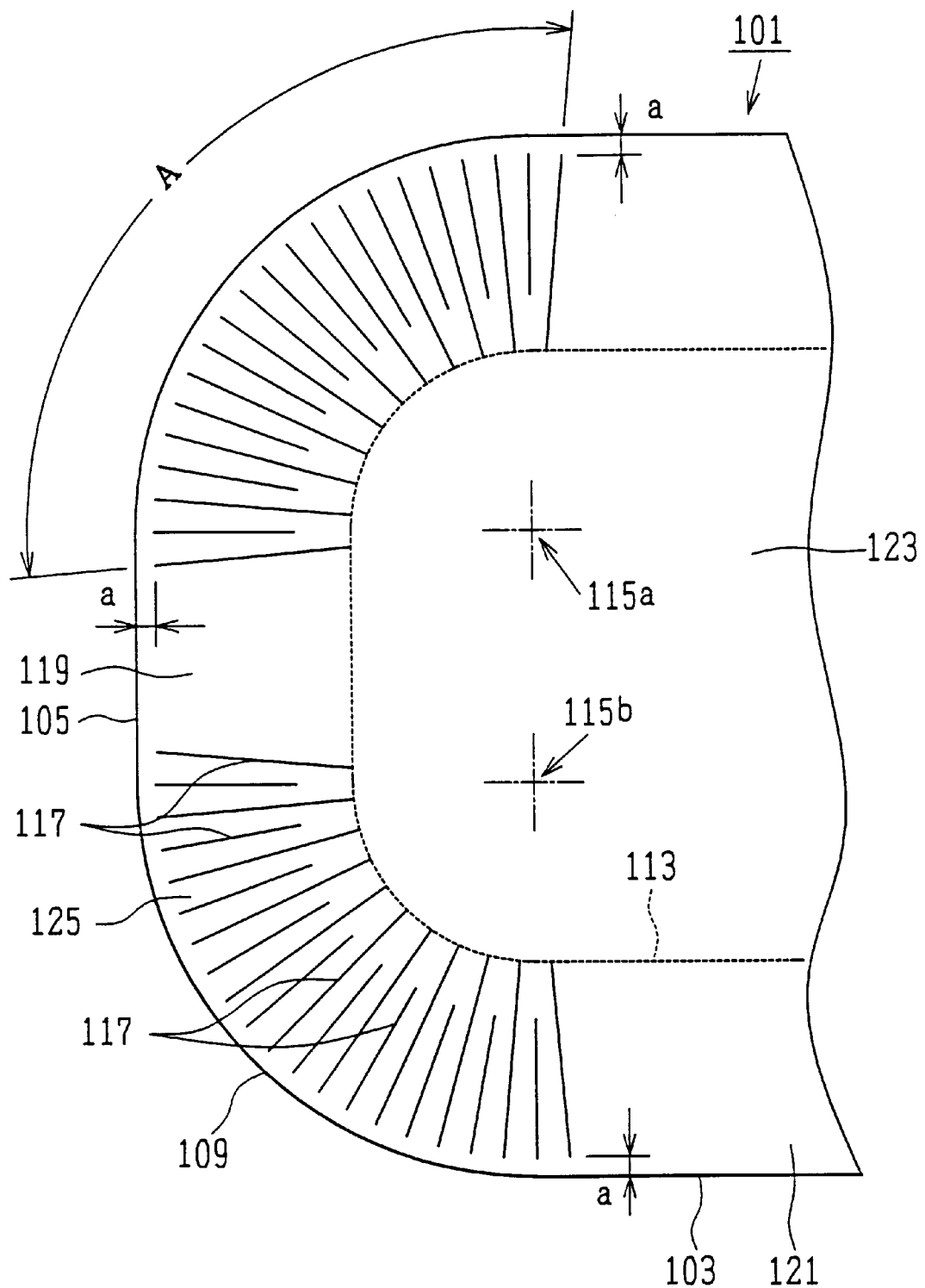
FIG. 1 is a diagram showing the left half of a paperboard material according to a first embodiment of the present invention.
Figure 2:
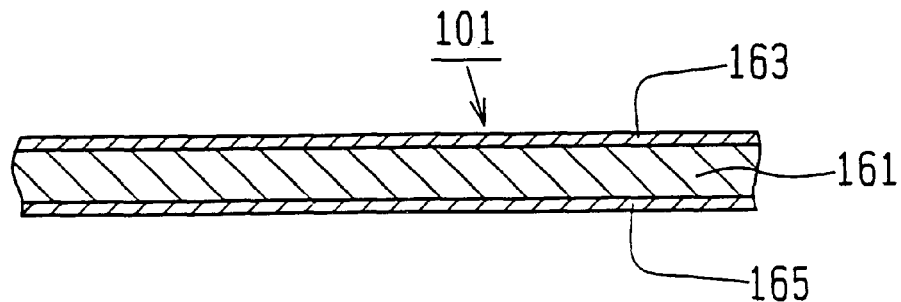
FIG. 2 is a diagram showing the cross-sectional structure of the paperboard material in FIG. 1.
Figure 3:
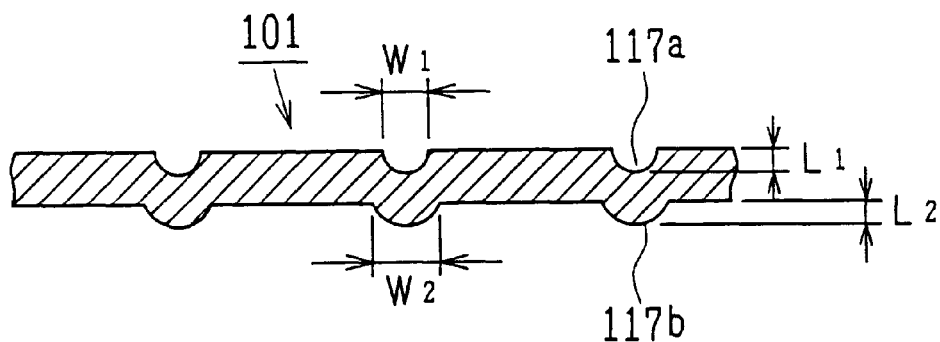
FIG. 3 is a diagram showing the cross-sectional structure of the score lines formed in FIG. 1.

FIG. 1 is a diagram showing the left half of a blanked paperboard material for a rectangular formed receptacle according to a first embodiment of the present invention, FIG. 2 is a diagram showing the structure of a cross section of the paperboard material of FIG. 1, and FIG. 3 is a diagram showing a cross section of the score lines in FIG. 1.

Figure 21:
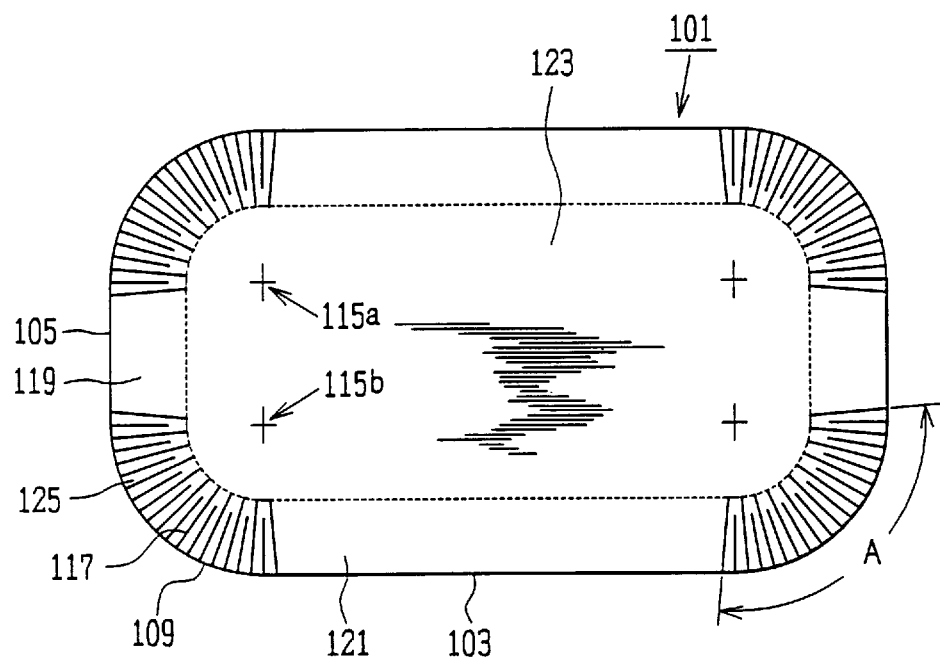
FIG. 21 is a diagram showing the form of the paperboard material for the rectangular paper receptacle shown in FIG. 20.

Referring to these diagrams, the paperboard material 101 is mainly composed of a white paperboard 161 with a thickness of 0.22 to 0.50 mm (weight: 200 to 450 g/m$^2$, density: 0.65 to 0.82, gas permeability: 50 to 200 sec.) Formed or bonded on the inside of the receptacle is a heat-resisting resin coating layer or a heat-resisting resin film layer 163 composed of polyester (thickness: 40 to 45 $\mu$m), polymethyl pentene (thickness: 25 to 30 $\mu$m), polycarbonate, or the like. Formed on the other side, the outside of the receptacle, is a thin resin coating layer 165 having the slipping property and permeability to gas and liquid. The shapes of the boundary 113 of the portion corresponding to the bottom 123 designated by the dotted line and the portions corresponding to the peripheral walls 119 and 121 are the same as those of the paperboard material of FIG. 21 shown in the conventional example.

The score lines 117 are formed in the fan-like areas A radially around the centers of the curved portions, 115a and 115b, from the boundary 113. Unlike the conventional example of FIG. 21, however, the score lines 117 terminate on the inside of the edge of the paperboard material 101 at a dimension "a" of about 1 to 3 mm, instead of extending to the edge. The score lines 117 are formed by pressing the paperboard material 101 with a die from the inner side of the receptacle toward the outer side as shown in FIG. 3. The concave portions 117a of the score lines 117 have a depth $L_1$ (0.1 to 0.3 mm) and a width $W_1$ (0.5 to 1.0 mm) and the convex portions 117b have a depth $L_2$ (0.1 to 0.25 mm) and a width $W_2$ (0.8 to 1.6 mm.)

Figure 4:
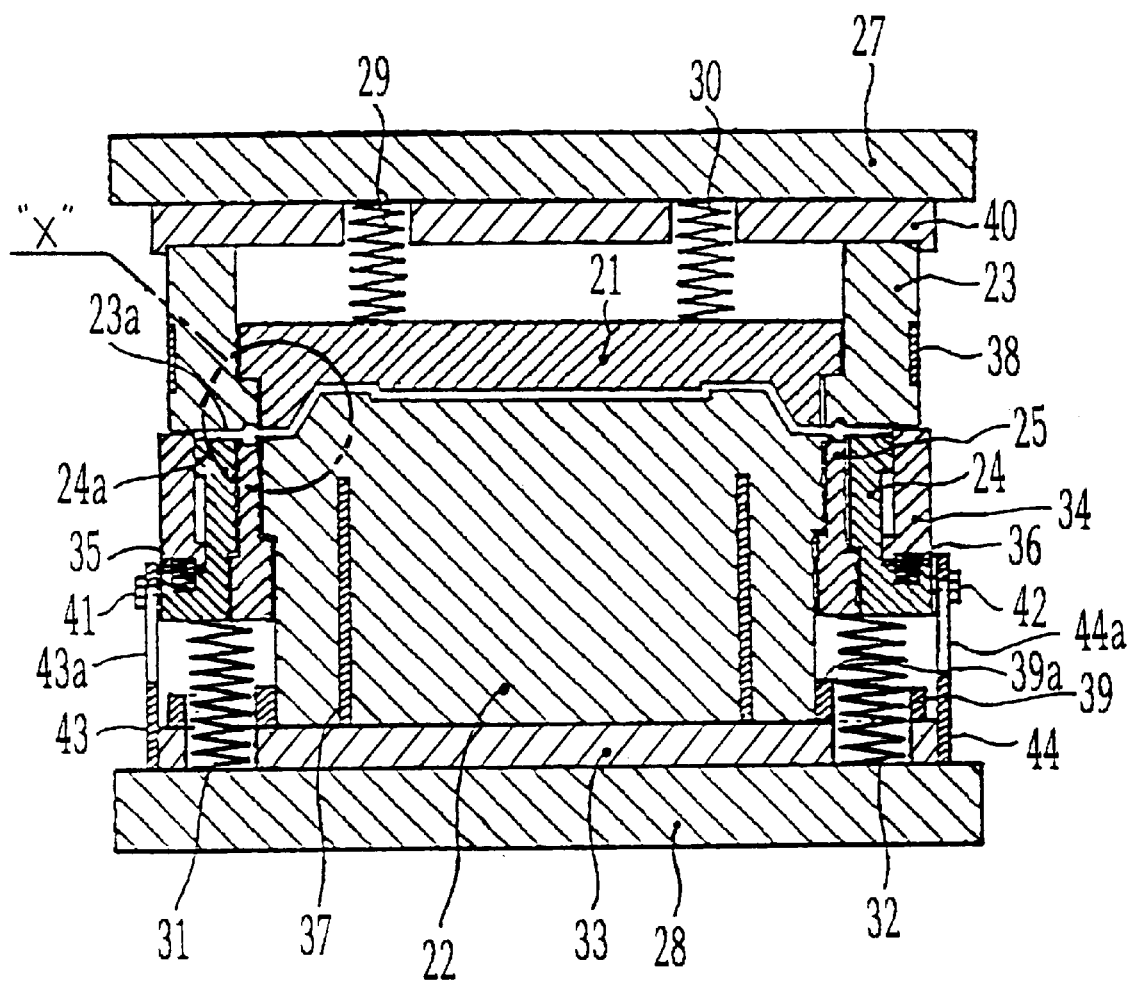
FIG. 4 is a diagram showing a cross-sectional structure of a machine for forming the paper receptacle according to the first embodiment of the present invention.

FIG. 4 shows a cross-sectional structure of a machine for forming the paperboard material shown in FIG. 1 to produce a paper receptacle.

Referring to the diagram, a first die member 21 and a second die member 22 are provided as a pair of die members. A first outer frame member 23 is provided around the first die member 21, which is attached to a base portion 27 through a supporting plate 40. The lower end of the first outer frame member 23 inwardly protrudes to form a stopper and the upper end of the first die member 21 outwardly protrudes to form a stopper.

These stoppers abut on each other so that the first die member 21 can be supported by the first outer frame member 23. Springs 29 and 30 are provided between the first die member 21 and the base portion 27. These springs 29 and 30 downwardly energize the first die member 21.

The second die member 22 is attached to a base portion 28 through a supporting plate 33. Provided around the second die member 22 is a circular curl ring member 25 having straight and curved portions on its periphery. Provided around the curl ring member 25 is a circular second outer frame member 24. The curl ring member 25 and the second outer frame member 24 are both upwardly energized by springs 31 and 32.

The upper part of the second die member 22 outwardly protrudes to form a stopper, which abuts on the stopper inwardly protruding in the lower part of the curl ring member 25 to position the curl ring member 25 by limiting its upward movement.

The lower part of the curl ring member 25 outwardly protrudes to form a stopper, which abuts on a stopper protruding in the upper part of the second outer frame member 24.

Provided around the second outer frame member 24 is a positioning ring 34, which is upwardly energized by springs 35 and 36. The upward movement of the positioning ring 34 is limited by abutment of the stopper inwardly protruding in the lower part of the positioning ring 34 and the stopper outwardly protruding in the upper part of the second outer frame member 24.

The upper part of the positioning ring 34 is formed to upwardly protrude beyond the second outer frame member 24 and the curl ring member 25. Pressing the upwardly protruding top part of the positioning ring 34 against the energizing force of the springs 35 and 36 enables the positioning ring 34 to downwardly move.

The lower parts of the springs 31 and 32 upwardly energizing the second outer frame member 24 and the curl ring member 25 are located on the base portion 28 through the holes formed in the supporting plate 33. A circular stopper ring 39 is provided on each of the holes of the supporting plate 33 through which the springs 31 and 32 pass, the springs 31 and 32 passing through the holes formed in the stopper ring 39.

The inner part of the stopper ring 39, which faces the curl ring member 25, has a slightly raised step 39a. When the second outer frame member 24 and the curl ring member 25 downwardly move against the energizing force of the springs 31 and 32, the curl ring member 25 hits the step 39a of the stopper ring 39 to stop. The lower end of the second outer frame member 24 and the stopper ring 39 are formed so as not to abut on each other even at the bottom dead point.

Pins 41 and 42 are attached to the second outer frame member 24 in proper parts in its lower part. These pins 41 and 42 are passed through engaging holes 43a and 44a of engaging plates 43 and 44, respectively. As the second outer frame member 24 moves up and down, the pins 41 and 42 move up and down in the ranges of the engaging holes 43a and 44a. Accordingly, the positions of the top dead point and the bottom dead point of the second outer frame member 24 can be adjusted by adjusting the relative positions of the engaging holes 43a and 44a and the pins 41 and 42.

A band heater 38 is attached around the first outer frame member 23 and a band heater 37 is provided inside the second die member 22. The band heater 37 may be provided on the exterior surface of the second die member 22, instead of the inside of the second die member 22. The springs 35 and 36 for energizing the positioning ring 34 have a weak energizing force. Therefore, when the first outer frame member 23 moves down to abut on the second outer frame member 24 and the curl ring member 25, they are compressed even with a slight force so that the first outer frame member 23 can abut on the second outer frame member 24 and the curl ring member 25.

Although this diagram only shows the springs 35 and 36 on the right and left sides, springs for energizing the positioning ring 34 are also provided in other proper positions along the positioning ring 34. Similarly, not only the springs 31 and 32, but also other springs are provided in other proper positions along the second outer frame member 24 and the curl ring member 25 to energize the second outer frame member 24 and the curl ring member 25. The same is true for the springs 29 and 30 for energizing the first die member 21.

Figure 5:
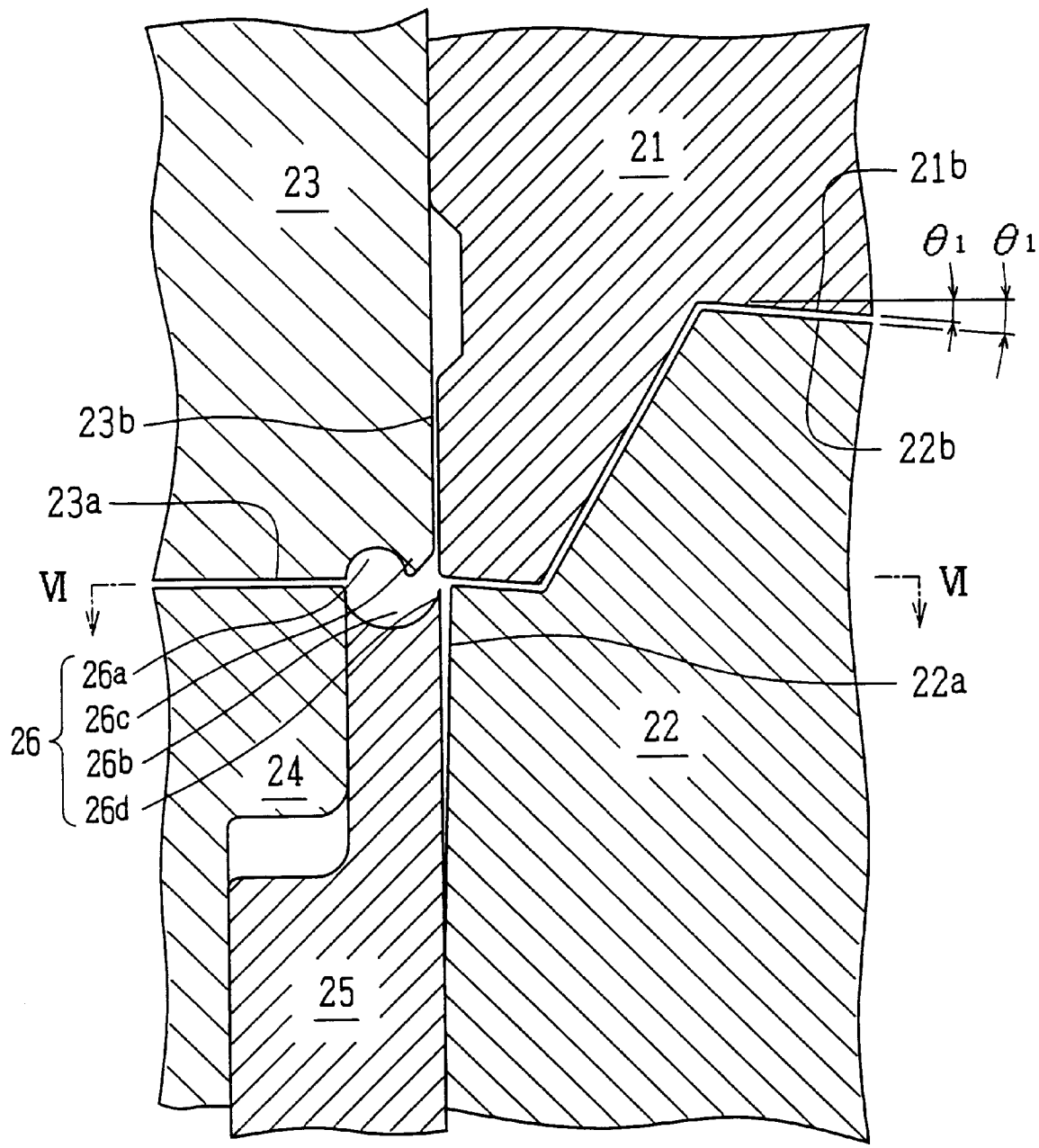
FIG. 5 is the enlarged cross-sectional view of "X" in FIG. 4.

FIG. 5 provides an enlarged view of the part "X" in FIG. 4.

Referring to the diagram, a circular groove 26a is formed on the inner end of the abutting surface 23a of the first outer frame member 23. As well, a groove 26b is formed in the abutting surface of the curl ring member 25, the groove 26b facing the groove 26a.

This diagram shows the first outer frame member 23 and the second outer frame member 24 and the curl ring member 25 abutting on each other. The grooves 26a and 26b are curved in the curl ring direction as shown in the diagram, which form the curling groove 26 when abutting.

The radius of the groove 26a of the first outer frame member 23 is different from the radius of the groove 26b of the curl ring member 25. That is to say, they are formed such that the groove 26a has a smaller radius than the groove 26b. As the result, the inner edge 26c of the groove 26a is located outside the inner edge 26d of the groove 26b. The clearance between the inner edge 26c of the groove 26a and the inner wall surface of the groove 26b is adjusted so that the inner edge 26c and the inner surface of the groove 26b can pinch and compact the edge of the periphery of the paperboard material when they abut. Although the grooves 26a and 26b in this embodiment have curved inner walls without irregularities, a large number of lateral grooves outwardly extending from the inside may be formed on their inner walls.

The peripheral portions of the corners of the paperboard material are apt to be irregular with folds. The irregular peripheral portions of the paperboard material are curled, guided by the lateral grooves, when inserted into the curling groove. Accordingly, formation of such lateral grooves enables curling with the folds uniformly distributed. In this embodiment, however, in which the score lines 117 are formed in the corners in advance, and with the effect of compacting the outer periphery of the paperboard material, the folds can be uniformly distributed and absorbed by the score lines 117 so that the paperboard material can be smoothly curled, without the necessity of forming such lateral grooves.

The parts for forming the bottom of the formed receptacle, that is, the bottom surface 21b of the first die member 21 and the top surface 22b of the second die member 22 are parallel to each other, but are both inclined toward the center at $\theta_1$ (about one to three deg) with respect to the horizontal plane. The reason for this is as follows: The paperboard material used in this embodiment is porous and lacks firmness. Accordingly, the angle between the bottom and the side walls of the receptacle is set smaller than the original angle to increase the resistance of the formed receptacle to deformation.

Figure 6:
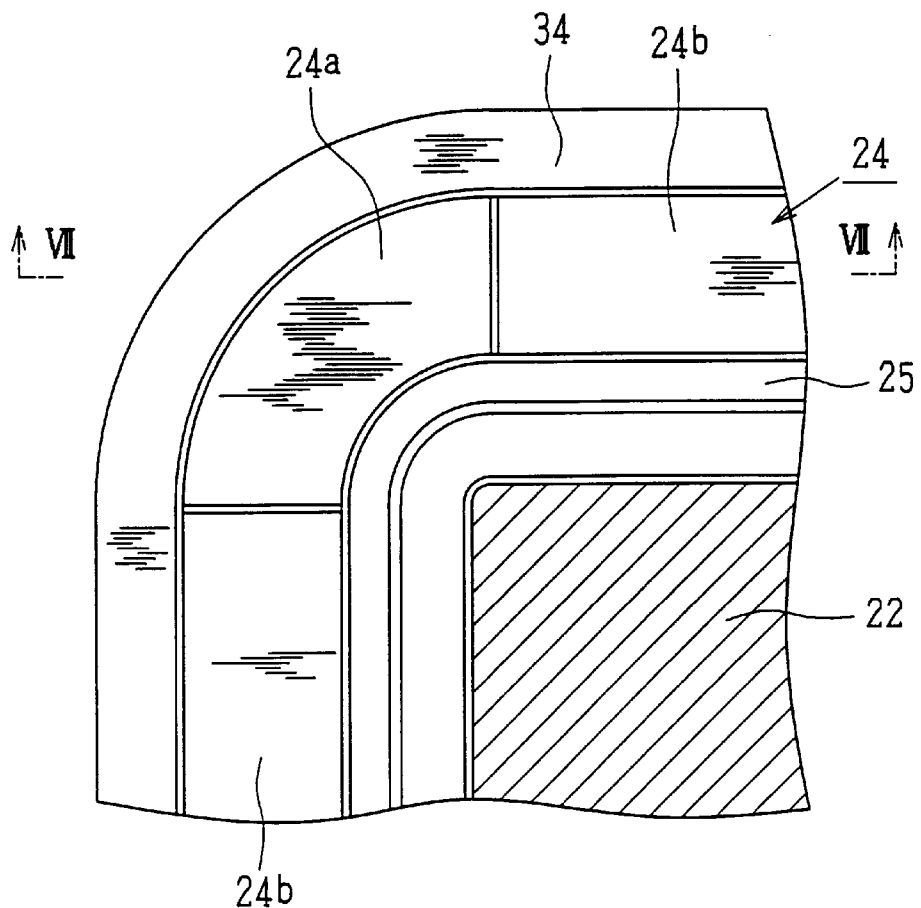
FIG. 6 is the cross-sectional view along the line VI—VI in FIG. 5.
Figure 7:
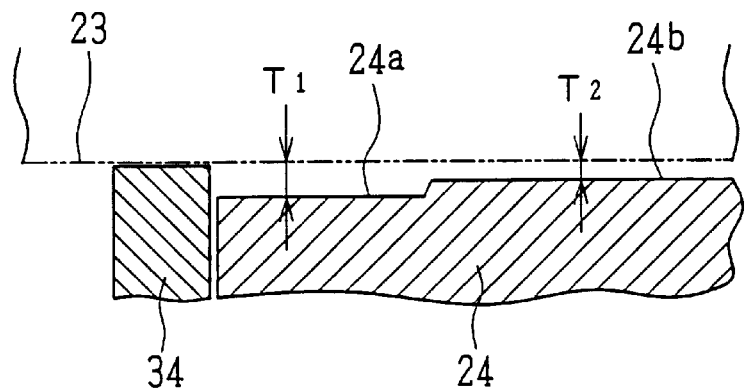
FIG. 7 is the cross-sectional view along the line VII—VII in FIG. 6.

FIG. 6 is the cross-sectional view along the line VI—VI in FIG. 5, mainly showing a corner of the second outer frame member, and FIG. 7 is the cross-sectional view along the line VII—VII in FIG. 6.

Referring to these figures, in the top surface of the second outer frame member 24, the surface 24a corresponding to a corner of the receptacle is formed lower than the surface 24b corresponding to a straight part of the receptacle. Specifically, the clearances $T_1$ and $T_2$ above the surfaces 24a and 24b formed when the first outer frame member 23 abuts on the positioning ring 34 are, if the paperboard material is 0.4 mm thick, set approximately as $T_1=0.3-0.35$ mm, $T_2=0.2-0.3$ mm.

The surface 24a of the second outer frame member 24 corresponding to a corner of the receptacle and the surface 24b corresponding to a straight portion of the receptacle are formed at different levels from each other for the reason given below.

In the case of a rectangular receptacle, when the peripheral portion of the paperboard material is compacted, folds take place, with the effect of the score lines formed in the corners of the paperboard. Accordingly, a large difference in thickness is caused between the corners and the straight portions of the paperboard material. Therefore, if the clearance between the top surface of the second outer frame member and the first outer frame member is uniform as in a conventional forming machine, the portions corresponding to the corners are extremely compressed, which will increase the possibility that the paper may be broken in the compacting process. Even if the compacting process is finished without problem, with the conventional machine, the peripheral portions of the straight portions are not sufficiently compacted as compared with the corners, which may cause the curled parts of the straight portions to buckle or to be insufficiently curled in the following curling process, degrading the quality of the paper receptacle.

Figure 8:
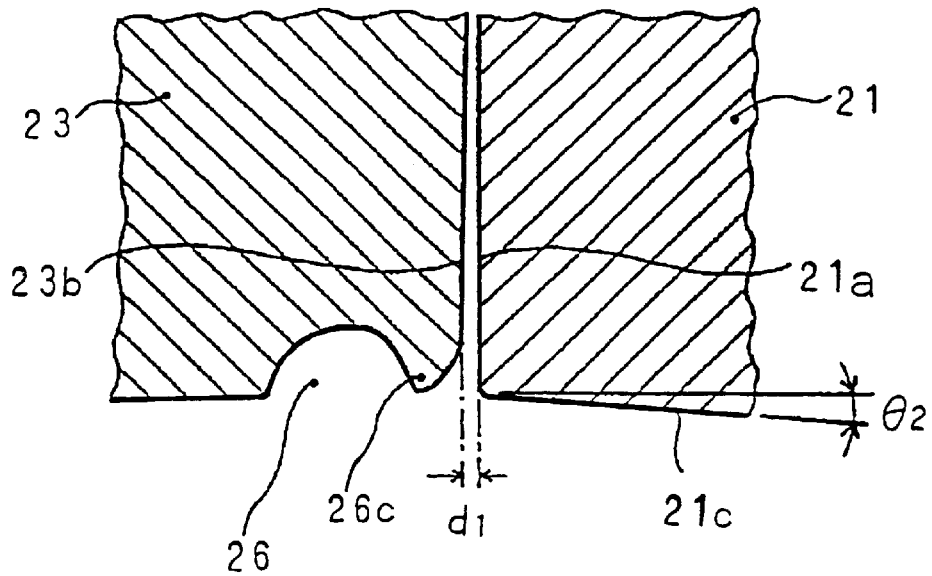
FIG. 8 is an enlarged cross-sectional view of the main part of the first die member 21 and the first outer frame member 23 shown in FIG. 5.

FIG. 8 is an enlarged cross-sectional view showing the main part of the first die member 21 and the first outer frame member 23 of FIG. 5.

Referring to the drawing, the clearance between the outer peripheral surface 21a of the first die member 21 and the inner peripheral surface 23b of the first outer frame member 23 becomes wider as it goes down. The inner edge portion 26c of the groove 26 is formed below the inner peripheral surface 23b. The clearance $d_1$ between the inner peripheral surface 23b and the outer peripheral surface 21a above the inner edge 26c is, though it depends on the material of the paperboard in the parts corresponding to the straight portions, preferably about two-thirds to one-fourth of the thickness of the paperboard, and is usually about one-third. If the clearance $d_1$ is larger than two-thirds of the thickness of the paperboard, the peripheral portion of the paperboard is not compacted sufficiently, causing difficulty in curling. If the clearance $d_1$ is smaller than one-fourth of the thickness of the paperboard, the limit of compression of paper is exceeded, and then the paper texture would be broken and torn, or the paper or the machine might be damaged. The clearance corresponding to the corners of the receptacle is equal to the clearance $d_1$ for the straight portion multiplied by the above-described $T_1/T_2$.

For the length, in the height direction, of the inclined surface of the inner wall surface 23b of the first outer frame member 23, the length necessary for curling plus an allowance is required. If the curling has a diameter of 3 mm, for example, it is preferable to set the length to about 10 mm.

Figure 9:
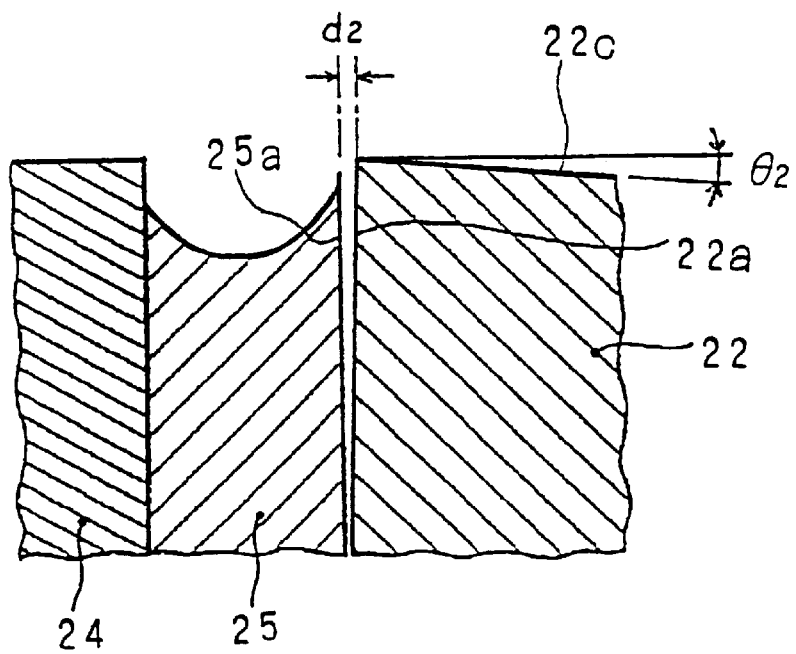
FIG. 9 is an enlarged cross-sectional view of the main part of the second die member 22, the curl ring member 25 and the second outer frame member 24 shown in FIG. 5.

FIG. 9 is an enlarged cross-sectional view showing the main part of the second die member 22, the second outer frame member 24 and the curl ring member 25 of FIG. 5.

The clearance between the outer peripheral surface 22a of the second die member 22 and the inner peripheral surface 25a of the curl ring member 25 becomes wider as it comes up, wherein the clearance $d_2$ in the widest topmost part is preferably the same as the clearance $d_1$ between the first die member and the first outer frame member. While the inner peripheral surface 25a of the curl ring member 25 extends in the vertical direction, the outer peripheral surface 22a of the second die member has an inclined surface which is inwardly inclined as it gets up. The length of this inclined surface in the height direction is equal to the length necessary for curling plus an allowance, similarly to that of the inner peripheral surface 23b of the first outer frame member 23. Accordingly, if the curling has a diameter of 3 mm, it is about 12 mm.

The length 12 mm includes a winding allowance of about 3 mm for curling, which results from consideration of productivity of the paper receptacles. That is to say, while winding a larger part strengthens the curling, this increases the winding resistance, reducing the productivity.

As shown in FIG. 8 and FIG. 9, the bottom surface 21c of the first die member 21 on the side of the first outer frame member 23 and the top surface 22c of the second die member 22 on the side of the curl ring member 25 are parallel to each other, but these surfaces are inclined toward the inside at an angle $\theta_2$ (about one to three deg) with respect to the horizontal plane. The purpose of this is to set the angle between the flange and the peripheral walls of the receptacle smaller than the original angle so that the formed receptacle can be highly resistant to deformation, for the paperboard material used in this embodiment lacks firmness.

Figure 10:
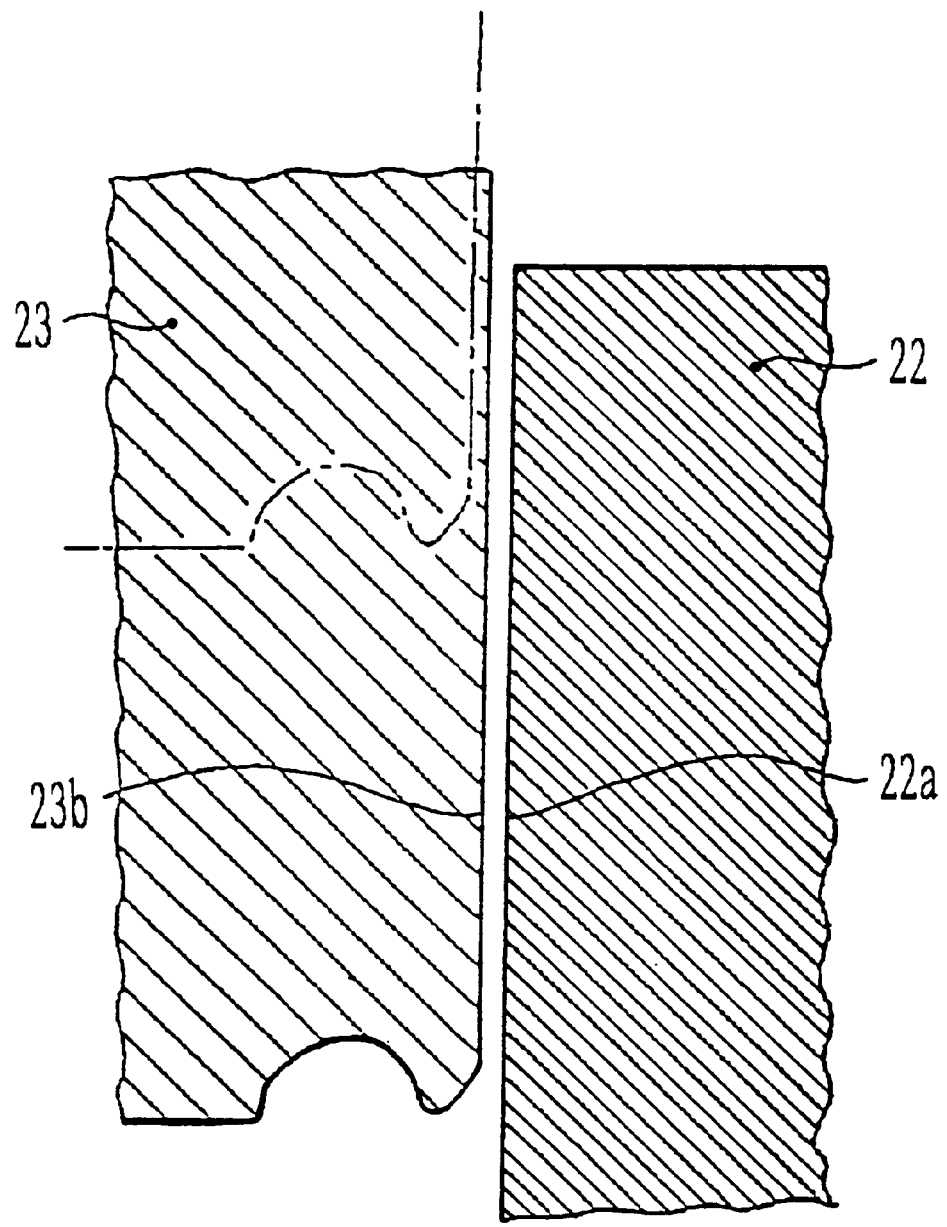
FIG. 10 is a diagram showing the change of the clearance between the first outer frame member 23 and the second die member 22 shown in FIG. 8 and FIG. 9.

FIG. 10 is an enlarged cross-sectional view showing the situation in which the first outer frame member 23 downwardly moves to iron and compress the peripheral portion of the paperboard in the clearance between the inner peripheral surface 23b of the first outer frame member 23 and the outer peripheral surface 22a of the second die member 22.

In this diagram, the first outer frame member 23 has moved down to reach the bottom dead point. In this situation, the clearance between the outer peripheral surface 22a and the inner peripheral surface 23b is equal to the above-described clearances $d_1$ and $d_2$. Accordingly, if the $d_1$ and $d_2$ are about one-third of the thickness of the paperboard, the clearance at the bottom dead point is about one-third of the thickness of the paperboard.

In FIG. 10, the phantom line shows the first outer frame member 23 in the course of the downward movement. As shown in this figure, the clearance between the inner peripheral surface 23b and the outer peripheral surface 22a is larger than the final clearance until the first outer frame member 23 reaches the bottom dead point. The clearance becomes smaller as it approaches the bottom dead point, so that the outer peripheral portion of the paperboard material is gradually ironed and compressed. Hence, according to this embodiment, rapid ironing to the outer peripheral portion of the paperboard material is avoided, which prevents seizure of the paperboard material onto the dies and breakage of the paperboard material due to friction between the contacting surfaces of the dies and the paperboard material.

Furthermore, since the inner peripheral surface 23b of the first outer frame member 23 and the outer peripheral surface 22a of the second die member 22 are somewhat inclined with respect to the forming direction, the paperboard is pressed while being formed. This allows the paperboard to be more strongly compressed as compared with a machine which vertically irons and compresses the paperboard, leading to easier curling.

Provided next is the description of the process of forming a rectangular paper receptacle with a curled periphery from the paperboard material of FIG. 1 by using the forming machine shown in FIG. 4

Figure 11:
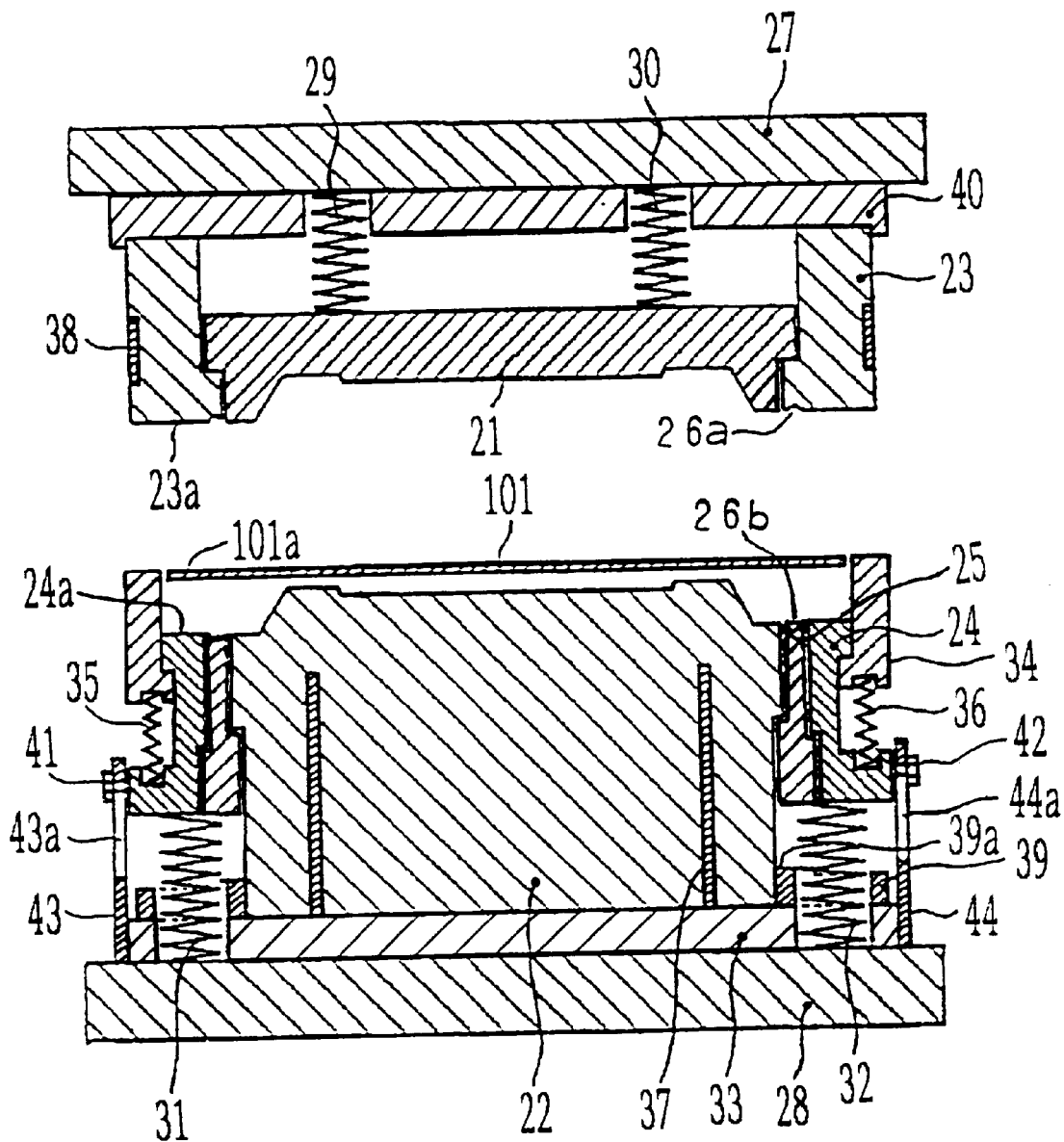
FIG. 11 is a cross-sectional view showing the forming machine shown in FIG. 4 with the paperboard material of FIG. 1 set therein.

First, as shown in FIG. 11, the paperboard material 101 is set on the second die member 22. At this time, the positioning ring 34 exists around the paperboard material 101 to place the paperboard material 101 in position.

Next, the first outer frame member 23 and the first die member 21 move down. At this time, the first outer frame member 23 forcibly moves down to punch and compact the peripheral portion 101a of the paperboard material 101 on the abutting surface of the second outer frame member 24. The first outer frame member 23 hits the positioning ring 34 before abutting on the second outer frame member 24. However, the springs 35 and 36 energizing the positioning ring 34 has so weak an energizing force that the positioning ring 34 moves down with a slight force not to interfere with the punching between the abutting surface of the first outer frame member 21 and the second outer frame member 24.

The punching between the surface 23a of the first outer frame member 23 and the surface 24a of the second outer frame member 24 compacts the peripheral portion 101a of the paperboard material 101 to increase its density.

Figure 12:
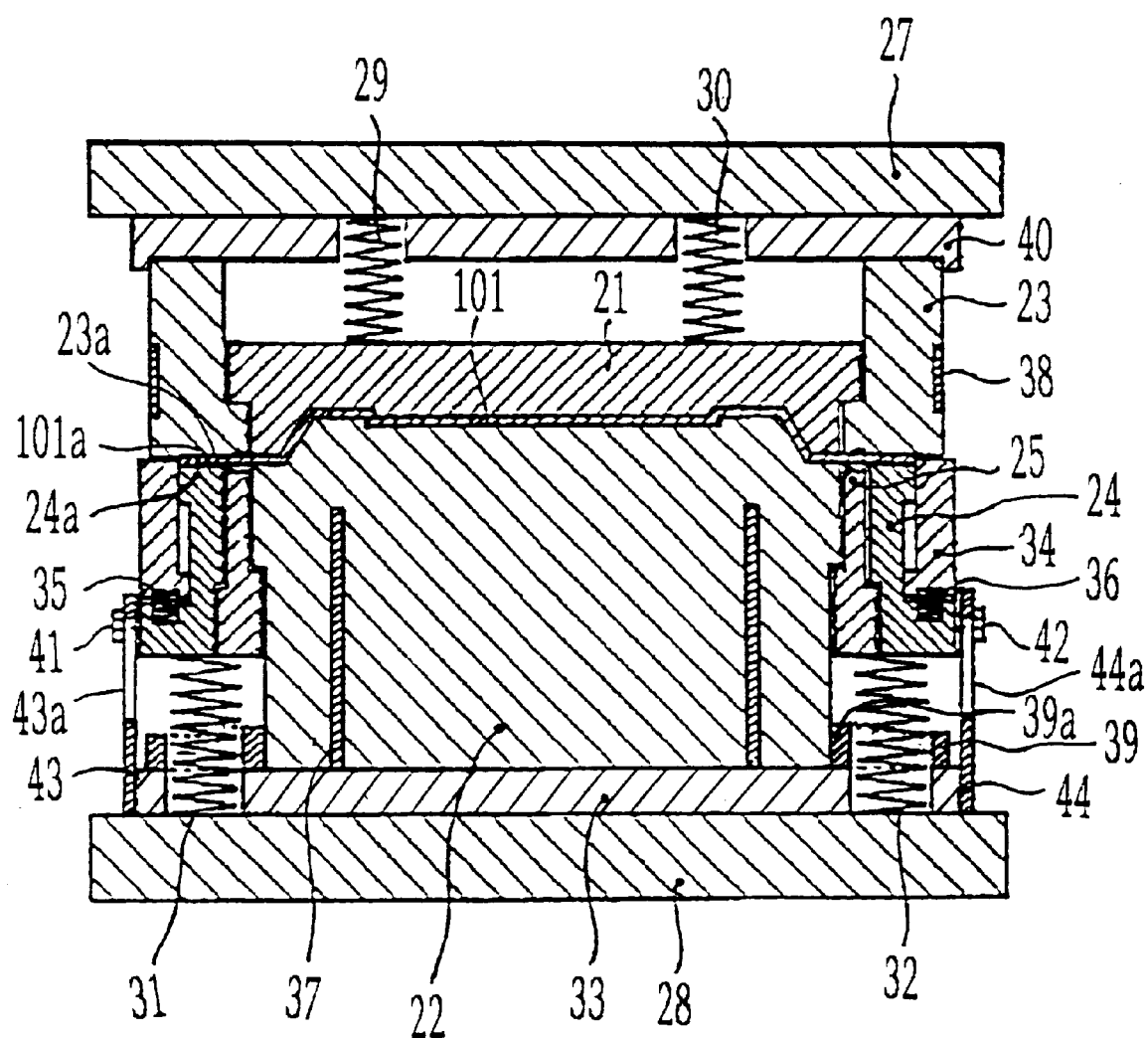
FIG. 12 is a cross-sectional view showing the situation in which the first die member 21 and the first outer frame member 23 have been lowered from the state shown in FIG. 11 to press the paperboard material 101.

FIG. 12 is a cross-sectional view showing the situation where the peripheral portion of the paperboard material is compacted, which shows the beginning of the process of pressing the paperboard material.

Referring to the diagram, the paperboard material 101 is pressed between the first die member 21 and the second die member 22 and formed into a certain form. The peripheral portion 101a of the paperboard material 101 is compacted between the first outer frame member 23 and the second outer frame member 24 as stated above and hence it becomes more dense. The positioning ring 34 is pressed down by the first outer frame member 23 and the springs 35 and 39 are in a compressed state.

In this state, when the base portion 27 further moves down, the springs 29 and 30 are compressed. The force of the compressed springs 29 and 30 serves to downwardly press the first die member 21, which further strongly presses the paperboard material 101 with the second die member 22. As the base portion 27 moves down, the first outer frame member 23 moves to press down the curl ring member 25, the second outer frame member 24 and the positioning ring 34 together. This pressing force compresses the springs 31 and 32, and the curl ring member 25, the second outer frame member 24 and the positioning ring 34 move down.

Figure 13:
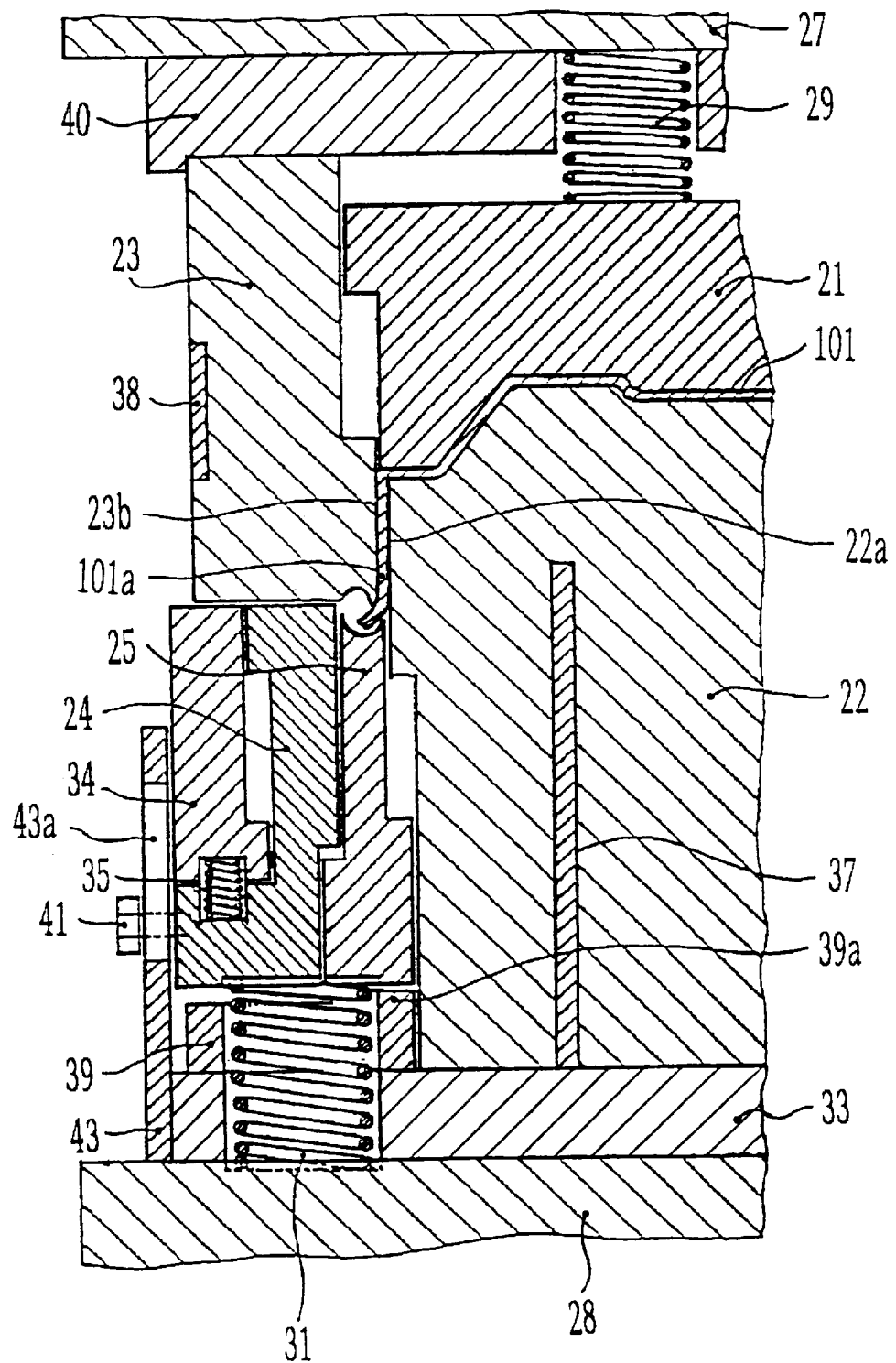
FIG. 13 is a diagram showing the situation in which the first outer frame member 23 has been further lowered from the state shown in FIG. 12.

FIG. 13 is a cross-sectional view showing the situation in which the curl ring member 25, the second outer frame member 24 and the positioning ring 34 are pressed by the first outer frame member 23 to move down.

Referring to the diagram, as the first outer frame member 23, the curl ring member 25, the second outer frame member 24 and the positioning ring 34 move down together, the peripheral portion 101a of the paperboard material 101 is forced into the clearance between the inner peripheral surface 23b of the first outer frame member 23 and the outer peripheral surface 22a of the second die member 22.

FIG. 13 shows the situation of immediately before the lower end of the curl ring member 25 abuts on the step 39a on the inside of the stopper ring 39. When the first outer frame member 23 further moves down, the curl ring member 25 hits the step 39a of the stopper ring 39. Then its movement is limited and stopped, and the second outer frame member 24 and the positioning ring 34 only move down.

Figure 14:
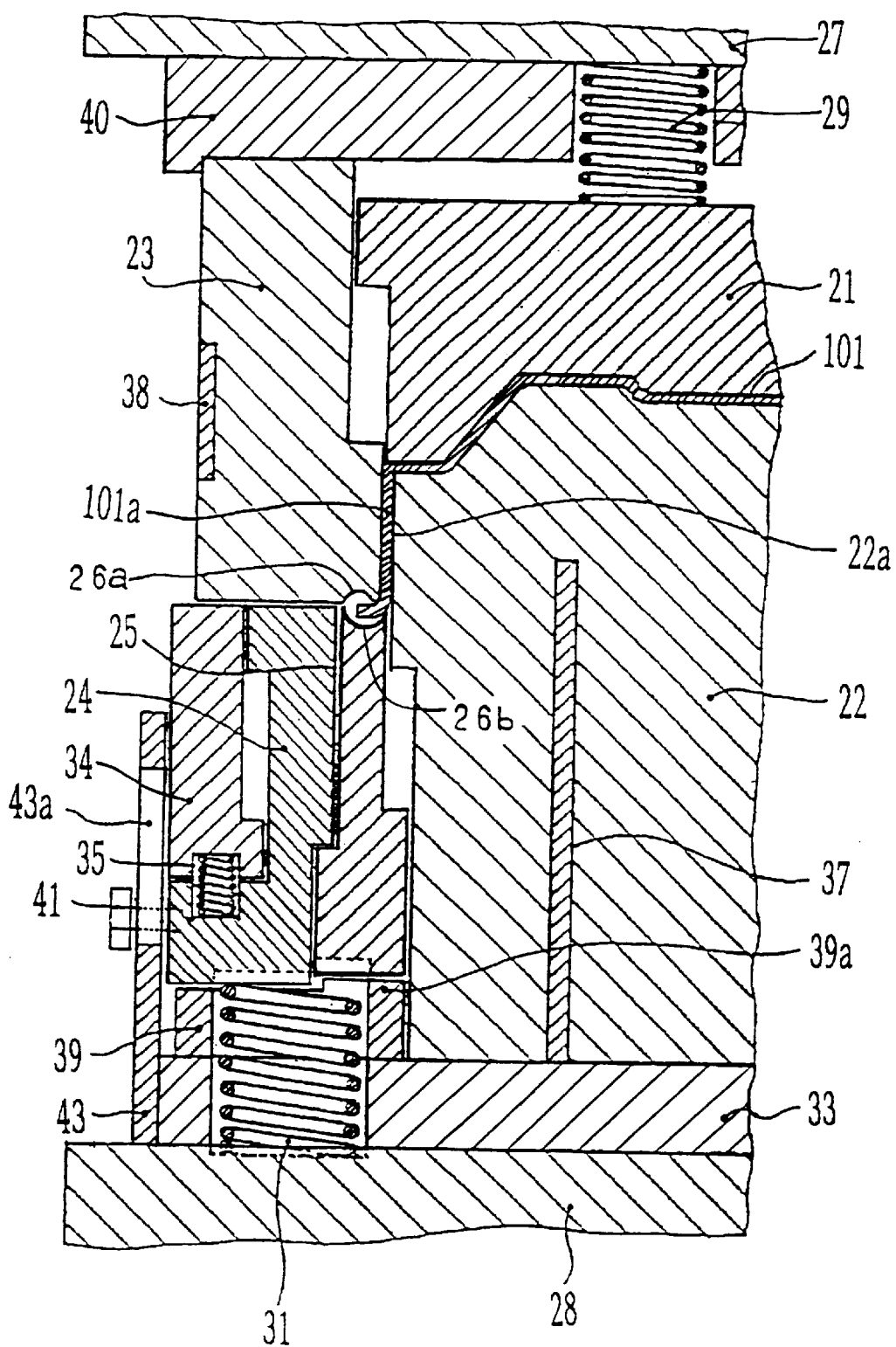
FIG. 14 is a diagram showing the situation in which the first outer frame member 23 has been further lowered from the state of FIG. 13 and the top surface of the second outer frame member 24 coincides with the top surface of the curl ring member 25.
Figure 15:
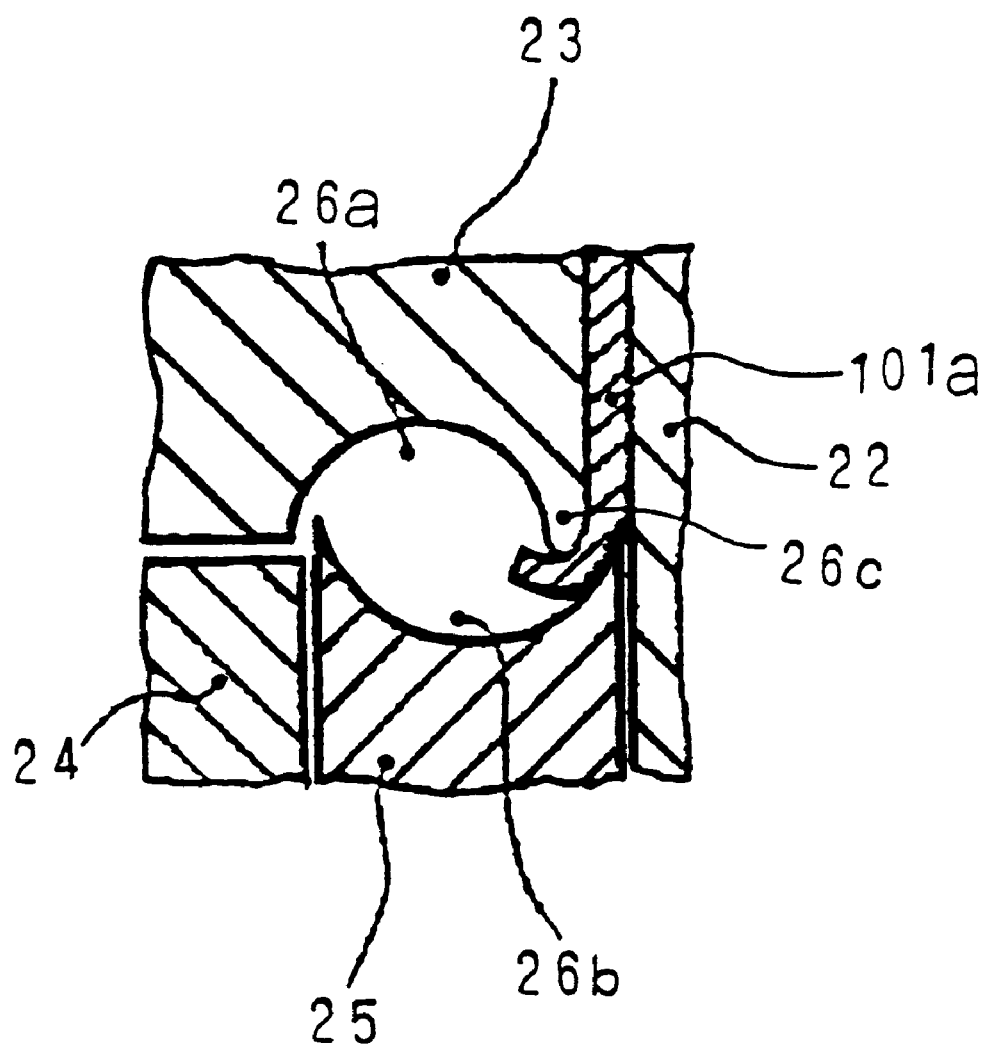
FIG. 15 is a diagram showing the change of the form of the groove when the first outer frame member 23 is further lowered from the state shown in FIG. 14.

FIG. 14 is a cross-sectional view showing this situation, where the curl ring member 25 abuts on the step 39a of the stopper ring 39 and its downward movement is limited and stopped. The second outer frame member 24, constructed not to abut on the outer lowered part of the stopper ring 39, further moves down to reach the bottom dead point. Since the curl ring member 25 is thus stopped and pressed earlier than the second outer frame member 24, the inner edge 26c of the groove 26a of the first outer frame member 23 pinches the edge of the peripheral portion 101a of the paperboard with the inner wall surface of the groove 26b and compacts it. Since the inner wall surface of the groove 26b is curved, as the inner edge 26c compresses the peripheral portion 101a of the paperboard material 101, its edge is bent and set in the curling direction. As the inner edge 26c of the groove 26a compacts the edge of the peripheral portion 101a of the paperboard material 101, the density of the edge of the paper further increases. At the same time, the curling set in the curling direction is formed on the edge as mentioned above.

Next, the base portion 27 starts moving in the opposite direction, or in the upward direction, and then the curl ring member 25, the second outer frame member 24 and the positioning ring 34, energized by the spring 31, move up together while abutting on the first outer frame member 23. This movement causes the peripheral portion 101a of the paperboard material 101 to enter the curling groove 26. The peripheral portion 101a of the paperboard material 101 inserted is curled along the curved inner wall in the curling groove to form the curling. At the same time, since the edge of the peripheral portion 101a, which has been compacted, has high density and is set in the curling direction, the peripheral portion 101a of the paperboard material 101 smoothly moves along the inner wall surface of the curling groove 26 and is curled. Because the peripheral portion 101a of the paperboard material 101 has been compacted and hence has high density, and the score lines do not extend to the edge, it is firm enough to be smoothly curled without buckling in the curling groove. Since the curling is formed this way, the curled portion has increased strength.

Figure 16:
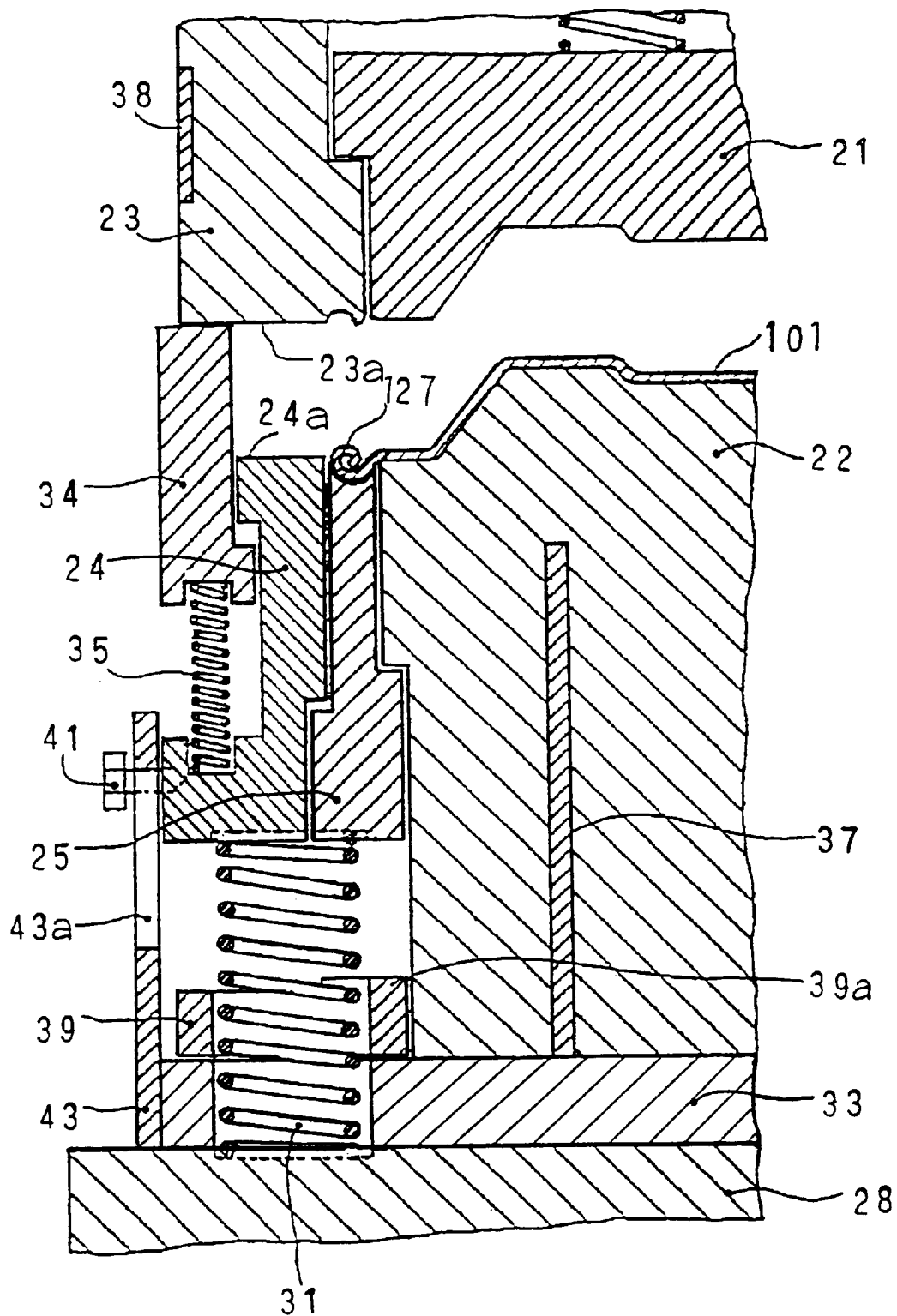
FIG. 16 is a diagram showing the situation in which the first outer frame member 23 has been raised from the states of FIG. 14 and FIG. 15 and the curling has been formed around the outer periphery of the paperboard material 101.

FIG. 16 is a cross-sectional view showing the situation in which the periphery of the paperboard material is curled.

Referring to the figure, after the pin 41 reaches the upper end of the engaging hole 43a and the upward movement of the second outer frame member 24 is limited and stopped, the positioning ring 34 moves up in contact with the first outer frame member 23 due to the energizing force of the spring 35 to return to the initial position shown in FIG. 11. The paperboard material 101 has been pressed by the die members 21 and 22 into a predetermined form, and the peripheral portion 101a of the paperboard material 101 has been curled into the curling 127.

When the base portion 27 moves up to return to the position shown in FIG. 11, the formed rectangular receptacle with curling is removed from the second die member 22 and the next paperboard material is set for the next forming process.

The machine of this embodiment serves as a longitudinal type pressing machine with its center axis extending in the vertical direction, with the first die member 21 positioned above and the second die member 22 positioned below. In forming paper receptacles with curling, deviation between the die members is a serious problem and hence it is preferable to set the accuracy to 0.1 mm or smaller.

Dimension and shape, such as external diameter, of the curling can be appropriately selected depending on the size of the paper receptacle, the thickness of the paper, quality of the paper, etc. Considering strength of the paper receptacle, thickness of the paper receptacles when stacked, and so on, it is preferable to set the external diameter of the curling to about 1.5 to 5 mm.

Figure 17:
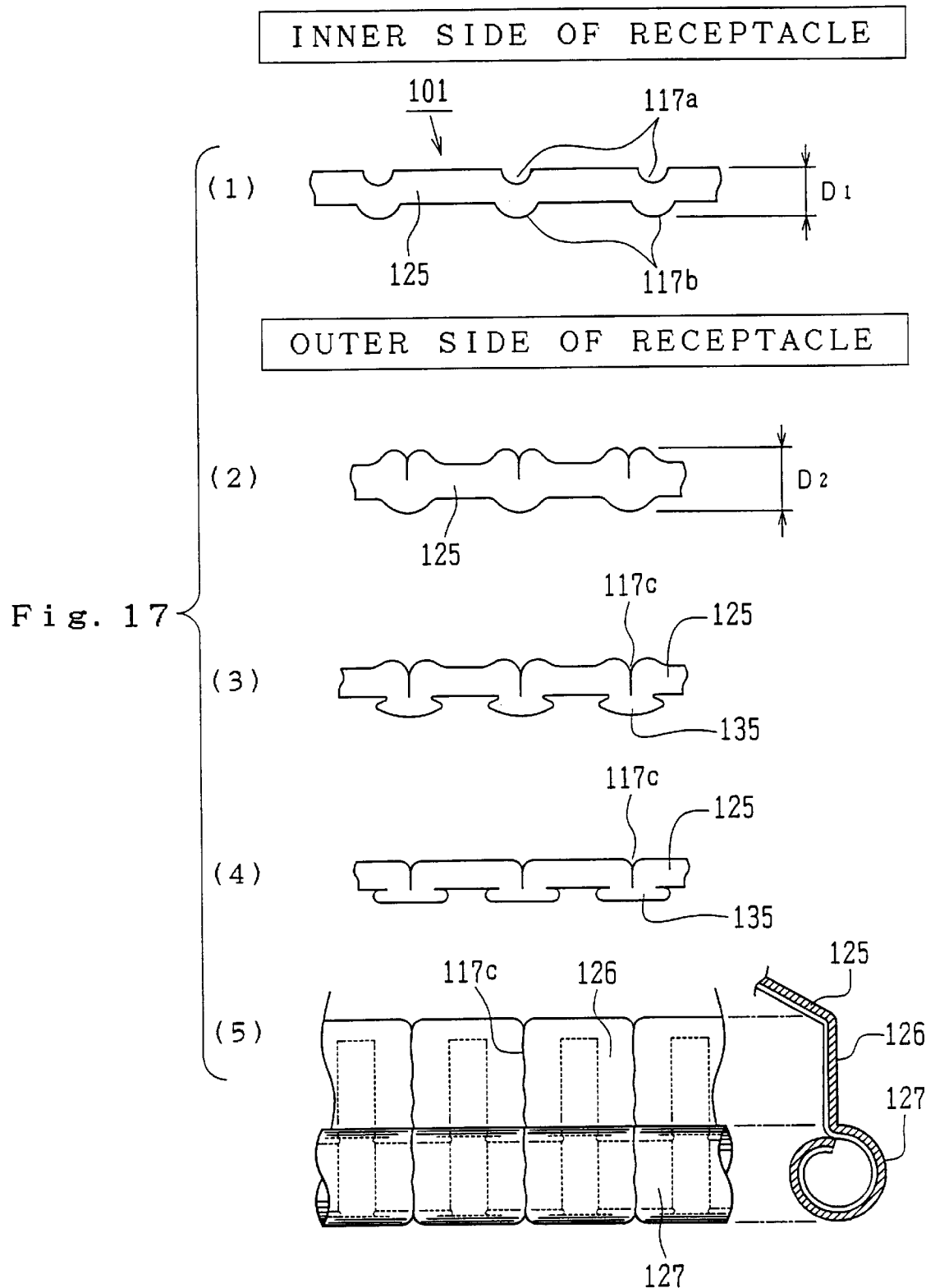
FIG. 17 is a diagram showing the change of shape of the score lines 117 formed in the paperboard material 101 of FIG. 1 in the forming process.

FIG. 17 is a diagram for describing how the score lines 117 formed in the paperboard material 101 of FIG. 1 change in the forming process.

Figure 22:
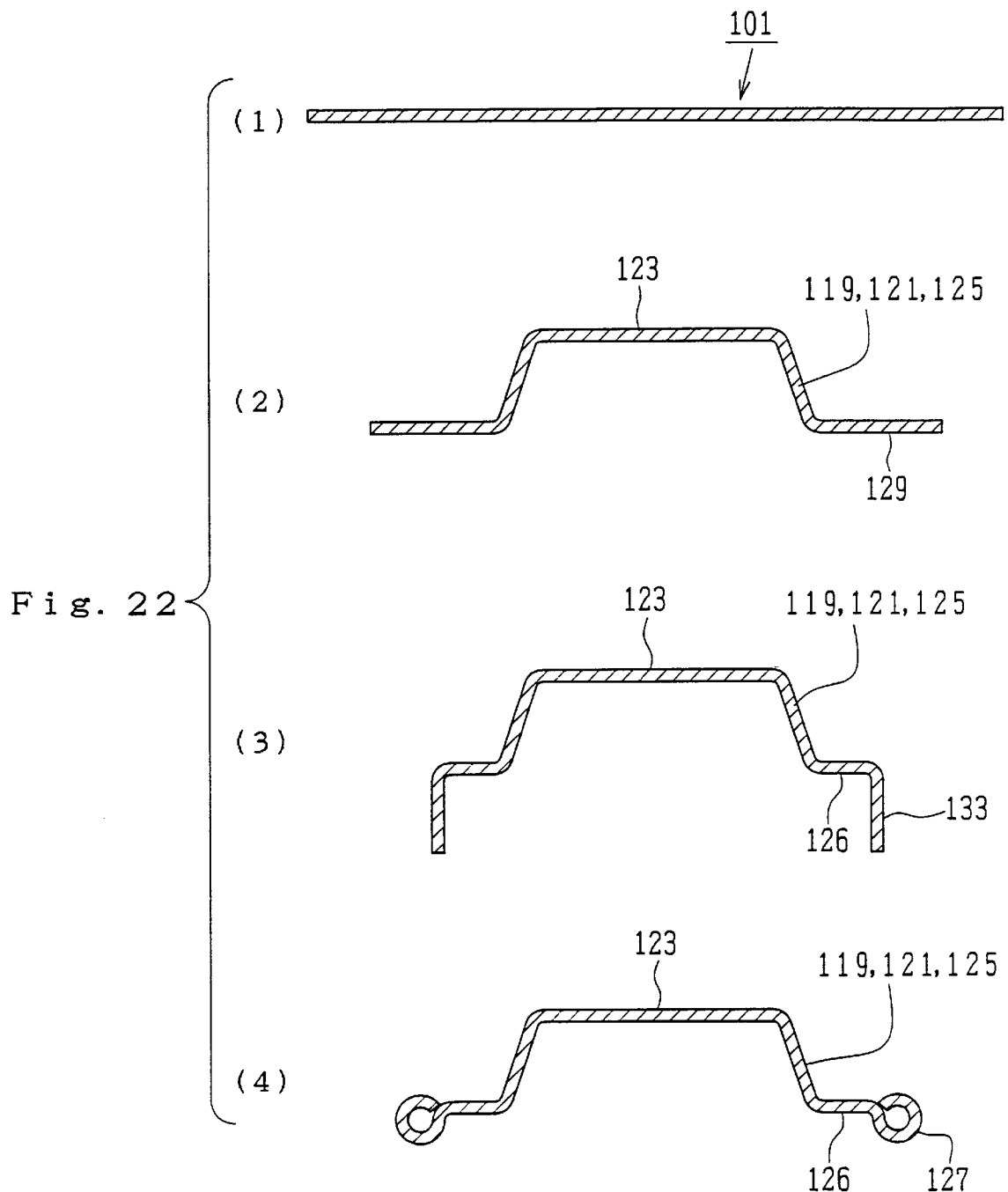
FIG. 22 is a process diagram schematically showing the process of forming the paperboard material of FIG. 21 to produce the rectangular receptacle of FIG. 20.
Figure 23:
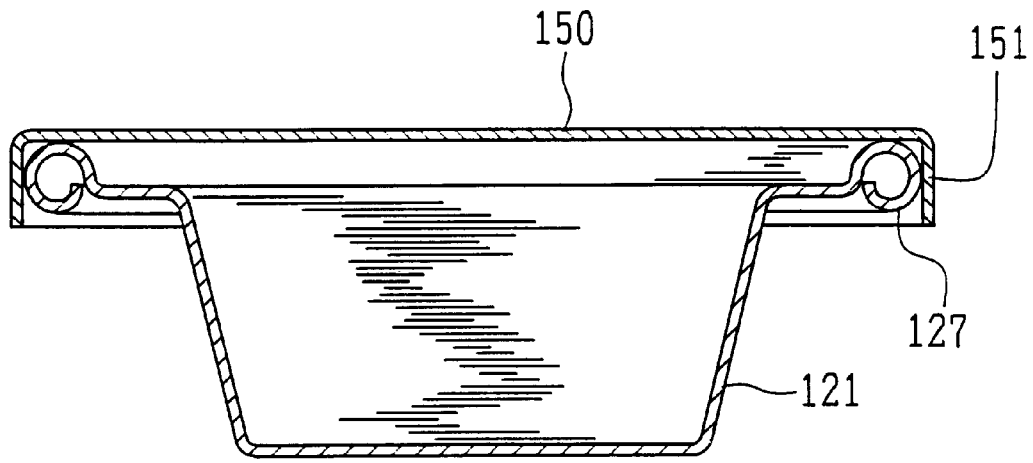
FIG. 23 is a cross-sectional structure diagram showing the rectangular paper receptacle shown in FIG. 20 when used as a receptacle with a cover.
Figure 24:
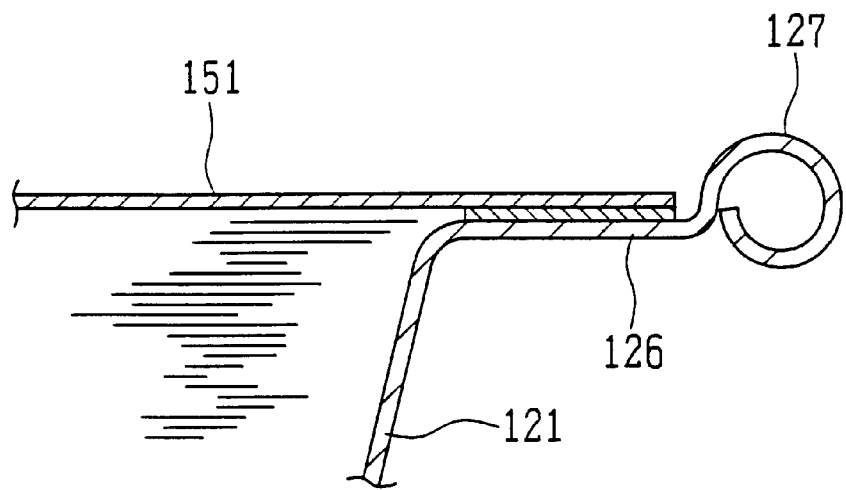
FIG. 24 is a cross-sectional view showing a main part of the rectangular paper receptacle of FIG. 20 with protection film heat sealed by using the flange portion 126.

Referring to these diagrams, as shown in FIG. 17(1), the thickness of the peripheral corner 125, before being formed, wherein the score lines 117 are formed is taken as $D_1$. When the peripheral walls 119, 121, and 125 are formed in this paperboard material 101, as shown in FIG. 22(2), the peripheral corner 125 is placed in a compressed state as it is contracted due to formation of the plate-like peripheral walls 119 and 121 on both sides. Then its thickness increases to $D_2$. In this state, as shown in FIG. 13, the first outer frame member 23 is lowered to form the upstanding portion 133. Then the upstanding portion 133 is ironed in the clearance between the inner peripheral surface 23b of the first outer frame member 23 and the outer peripheral surface 22a of the second die member 22. As the result, as shown in FIG. 17(3), the convex portions 117b of the score lines 117 on the outer side of the receptacle are formed into the folds 135 and the concave portions 117a of the score lines 117 formed on the inner side of the receptacle are compressed from both sides to form the individual concave score lines 117c. Finally, in the peripheral corner 125, as shown in FIG. 17(4), the inner side of the receptacle is formed into a smooth surface wherein only the concave score lines 117c are formed, and on the outer side of the receptacle, the folds 135 are flattened. Then it is curled as shown in FIG. 17(5).

When the paper is formed with the score lines 117 formed on the inner side of the receptacle, the score lines 117 thus absorb the folds in the corners. Accordingly, the irregularities on the surface of the flange 126 of the receptacle become very small, with the surface roughness of 70 μm or smaller. This reduces inferior welding when protection film is heat-sealed to the flange 126.

In the portion corresponding to the curling 127, the score lines 117 are not formed in the entire area as stated above. Therefore, fibers of the paperboard material are partially prevented from being cut or broken when the score lines 117 are formed and the concave score lines 117c in the curling 127 are not formed so deep that the strength of the curling 127 is reduced.

Although the paperboard material and the forming machine for rectangular receptacles of quadrilateral shape have been described in the embodiment above, the present invention is not limited to such rectangular receptacles but can be applied to rectangular receptacles of polygonal shapes such as hexagon and octagon as well. That is to say, a polygonal sheet material having alternate straight lines and curves around its periphery with rounded corners shall be prepared as paperboard material. The score lines shall be formed in the peripheral wall portions corresponding to the corners.

As to the forming machine, the individual parts shall be shaped corresponding to the paperboard material formed of the polygonal sheet material and the clearance for compacting the peripheral portion of the paperboard material and the clearance for ironing and compressing the peripheral portion of the paperboard material can be determined according to the conception given in the above-described embodiment.

Figure 18:
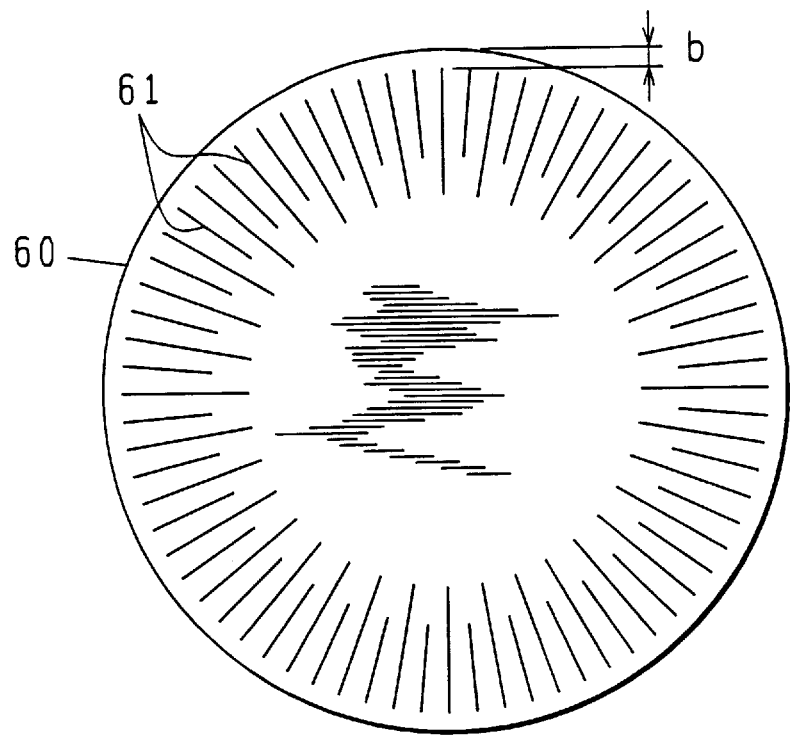
FIG. 18 is a diagram showing the form of the paperboard material for a circular paper receptacle according to a second embodiment of the present invention.
Figure 19:
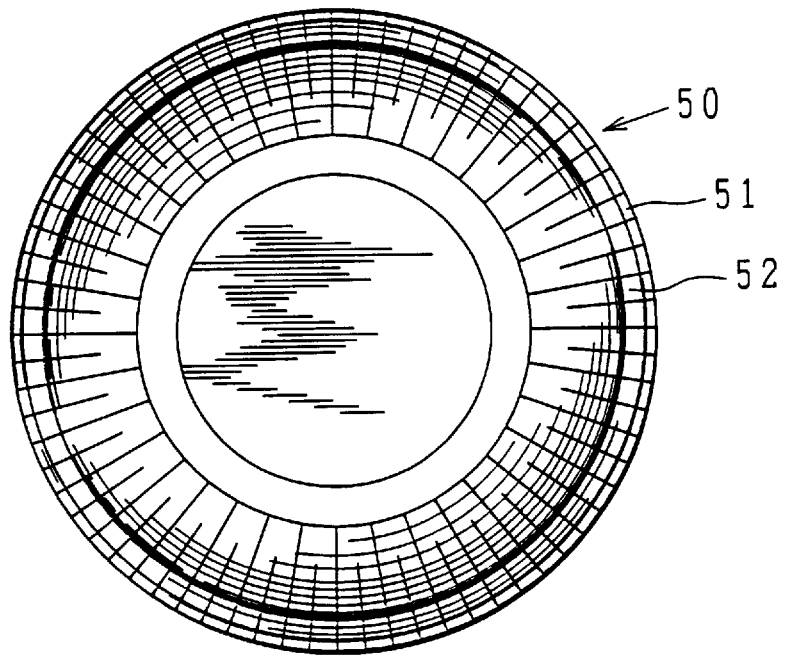
FIG. 19 is a plan showing a paper receptacle formed by using the paperboard material of FIG. 18.
Figure 20:
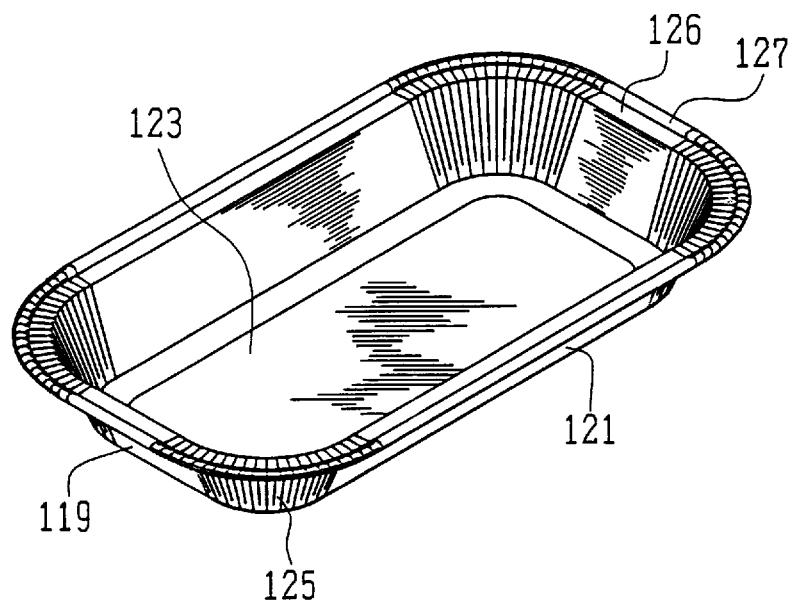
FIG. 20 is a perspective view showing the form of a conventional rectangular paper receptacle.

FIG. 18 shows a paperboard material for a circular paper receptacle according to a second embodiment of the present invention and FIG. 19 is a plan of the circular paper receptacle formed by using the paperboard material of FIG. 18.

Referring to these diagrams, the disk-like paperboard material 60 has a plurality of score lines 61 formed radially toward the periphery, the score lines 61 being terminated at the position inside of the periphery at a dimension b.

Forming the score lines 61 in this way increases the strength of the curling 51 and provides desired smoothness for heat sealing in the flange 52, similarly to the case of the rectangular paper receptacle of the above-described embodiment.

While the invention has been described in detail, the foregoing description is in all aspects illustrative and not restrictive. It is understood that numerous other modifications and variations can be devised without departing from the scope of the invention.

Industrial Applicability

As described on the above, the paper receptacle of the present invention is adopted to be used as a simplified tableware in a shop providing light meals and a camp, a party and the like out of doors, or as a simplified receptacle for foods in a supermarket and the like.

What is claimed is:

1. A paper receptacle formed only by press-forming a sheet of paperboard material, wherein said paperboard material has a multi-layered structure including, a paperboard having a weight of 200 to 450 $g/m^2$, a density of 0.65 to 0.82, and a gas permeability of 50 to 200 sec determined by measuring an average amount of time required to pass 100 ml of air through an area of 645 $mm^2$ in the paperboard, a first resin layer formed on the entire front surface of said paperboard and having liquid-impermeability and thermal resistance, and a second resin layer formed on the entire back surface of said paperboard and having permeability to air and liquid.

2. A paperboard material for a paper receptacle at least having a peripheral wall and having its outer periphery curled, which comprises:

a plurality of score lines impressed from the surface to the back side to extend approximately radially from a portion corresponding to said peripheral wall toward the outer periphery and to terminate inside said outer periphery at a distance between about 1 mm and about 3 mm therefrom, whereby when the paper receptacle has its outer periphery curled, the score lines will be free of any curling thereto.

3. The paperboard material according to claim 2, wherein said distance is not more than the length of the portion to be curled to said outer periphery.

4. The paperboard material according to claim 3, wherein said paperboard material Is composed of a sheet material of polygonal shape having rounded corners corresponding to a polygonal receptacle and said score lines are formed only in the peripheral wall portion corresponding to each of said corners.

5. The paperboard material according to claim 2, wherein said paperboard material is composed of a sheet material of polygonal shape having rounded corners corresponding to a polygonal receptacle and said score lines are formed only in the peripheral wall portion corresponding to each of said corners.

6. The paperboard material according to claim 2, wherein all of the score lines impressed in the paperboard material terminate at the distance from the outer periphery of the paperboard material.

7. A method for forming a paper receptacle, comprising:

preparing a paperboard material composed of a sheet material having an outer periphery of a polygonal shape with a straight portion, and a curved portion having rounded corners;

impressing a plurality of score lines from a surface of the paperboard material to a back side of the paperboard material to approximately radially extend toward the outer periphery in a portion corresponding to said curved portion, the impressing terminating an end of the score lines at a distance between about 1 mm and about 3 mm from the outer periphery;

after said impressing, compacting a straight peripheral portion corresponding to said straight portion in the outer peripheral portion of said paperboard materials and a curved peripheral portion corresponding to said curved portion in the outer peripheral portion of said paperboard material in such a way that said straight peripheral portion has a smaller thickness than said curved peripheral portion;

after said compacting, forcing said compacted straight peripheral portion and said curved peripheral portion into a clearance narrower than the respective compacted thicknesses to iron and compress said straight peripheral portion and curved peripheral portion; and curling said compressed outer peripheral portion of said paperboard material to form a curled portion.

8. A machine for forming a paper receptacle, the paper receptacle having a bottom portion, a side wall portion connecting with said bottom portion, a flange portion connecting with said side wall portion and extending in a horizontal direction, and a curled portion formed around an outer periphery of said flange portion, comprising;

first and second die members for pressing a paperboard material interposed therebetween to form said bottom portion, said side wall portion and said flange portion, said first die member and said second die member having respective surfaces facing each other, the surfaces having respective portions for forming the bottom portion of the paper receptacle, the respective portions being respectively angled toward a center of the respective die members and relative to a horizontal plane, whereby when said bottom portion and said side wall portion are formed when being pressed, an angle defined therebetween is smaller than the corresponding angle after being formed first and second outer frame members provided respectively around, and corresponding to, said first and second die members, said first and second outer frame members abutting on each other while pressing; and a curl ring member provided between said second die member and said second outer frame member so as to abut on an inner end of an abutting surface of said first outer frame member while pressing;

wherein the inner end of the abutting surface of said first outer frame member and an abutting surface of said curl ring member have respective circular grooves facing each other, said grooves having inner wall surfaces curved in a curling direction, said respective grooves being formed to constitute a curling groove when abutting, an inner edge of the groove of said first outer frame member is formed so as to be located outside an inner edge of the groove of said curl ring member when abutting to form a clearance, with an inner wall surface of the groove of said curl ring member, as can pinch and compact the edge of the outer peripheral portion of said paperboard material, said first die member and said first outer frame member relatively move toward said second die member and said second outer frame member, whereby said paperboard material is held between said first and second die members and the outer peripheral portion of said paperboard is pressed and compacted between said first and second outer frame members, with said first and second die members holding the paperboard material therebetween, said first outer frame member, said second outer frame member and said curl ring member, while abutting, are relatively moved to the side of said second die member, whereby the outer peripheral portion of said paperboard material is forced into a clearance between an inner peripheral surface of said first outer frame member and an outer peripheral surface of said second die member and ironed and compressed, when the edge of the outer peripheral portion of said paperboard material is located at the inner edge of said curling groove, only said curl ring member is caused to stop moving, whereby the edge of the outer peripheral portion of said paperboard material is pinched and compacted between the inner edge of the groove of said first outer frame member and the inner wall surface of the groove of said curl ring member and the curling set in the curling direction is formed on the edge of the outer peripheral portion of said paperboard material, and after forming said curling set, said first outer frame member, said second outer frame member and said curl ring member are moved, while abutting, in the opposite direction, to the side of said first outer frame member, whereby the outer peripheral portion of said paperboard material is inserted into said curling groove and curled along the inner wall surface of the curling groove, so as to form the curled portion.

9. The forming machine according to claim 8, wherein said paper receptacle is a polygonal paper receptacle having its outer periphery formed of a straight portion and a curved portion, and said first and second outer frame members are so formed that the press clearance of a flange straight portion for forming said straight portion is smaller than the press clearance of a flange curved portion for forming said curved portion.

10. The forming machine according to claim 9, wherein said flange straight portion of said second outer frame member has a surface that is higher than the surface of said flange curved portion of said second outer frame member.

11. The forming machine of claim 8, wherein said second outer frame member has an upper surface facing the first outer frame member, the upper surface having a first surface portion disposed at a first distance away from the first outer frame member, and a second surface portion disposed at a second distance away from the first outer frame member, the second distance being greater than the first distance.

12. The forming machine of claim 11, wherein the first surface portion and the second surface portion are disposed in essentially parallel planes.

13. The forming machine of claim 12, wherein the first surface portion is disposed immediately adjacent to the second surface portion so as to form a step arrangement.

14. The forming machine of claim 8, wherein the respective facing surfaces of said first die member and said second die member have further portions for forming the flange portion of the paper receptacle, the respective further portions being respectively angled toward the center of the respective due members and relative to the horizontal plane, whereby when said flange portion and said side wall portion are formed when being pressed, an angle defined therebetween is smaller than the corresponding angle after being formed.

15. The forming machine of claim 14, wherein the portions and the further portions of the respective surfaces are essentially planar.

16. A method for forming a paper receptacle, comprising:
preparing a paperboard material composed of a sheet material;
impressing a plurality of score lines into a surface of the paperboard material to approximately radially extend toward an outer periphery of the paperboard material, the impressing terminating an end of each of the score lines at a distance between about 1 mm and about 3 mm from the outer periphery of said paperboard material;
after said impressing, curling the outer periphery of said paperboard material to form a curled portion, whereby the score lines are free of any curling thereto.

* * * * *